(12) United States Patent
Kim et al.

(10) Patent No.: US 11,997,564 B2
(45) Date of Patent: May 28, 2024

(54) ELECTRONIC DEVICE AND METHOD FOR SUPPORTING POSITIONING COMMUNICATION

(71) Applicant: SAMSUNG ELECTRONICS CO., LTD., Suwon-si (KR)

(72) Inventors: Hyunchul Kim, Suwon-si (KR); Yi Yang, Suwon-si (KR); Moonseok Kang, Suwon-si (KR); Sukgi Hong, Suwon-si (KR); Jiho Shin, Suwon-si (KR); Jonghoon Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/317,638

(22) Filed: May 15, 2023

(65) Prior Publication Data
US 2023/0283985 A1    Sep. 7, 2023

Related U.S. Application Data

(63) Continuation of application No. 17/708,597, filed on Mar. 30, 2022, now Pat. No. 11,671,788, which is a
(Continued)

(30) Foreign Application Priority Data

Apr. 28, 2021    (KR) .................. 10-2021-0055158

(51) Int. Cl.
*H04W 4/02*  (2018.01)
*H04B 1/7163*  (2011.01)
*H04B 7/0404*  (2017.01)

(52) U.S. Cl.
CPC .......... *H04W 4/023* (2013.01); *H04B 1/7163* (2013.01); *H04B 7/0404* (2013.01)

(58) Field of Classification Search
CPC ... H04W 4/023; H04W 1/7163; H04B 7/0404
(Continued)

(56) References Cited

U.S. PATENT DOCUMENTS

| 10,455,156 B2 | 10/2019 | Lagnado et al. |
| 2010/0087146 A1 | 4/2010 | Han et al. |

(Continued)

FOREIGN PATENT DOCUMENTS

| JP | 2007-278731 A | 10/2007 |
| KR | 10-2010-0038790 A | 4/2010 |
| KR | 10-2016-0049759 A | 5/2016 |
| KR | 10-2020-0101218 A | 8/2020 |
| KR | 10-2020-0111558 A | 9/2020 |
| KR | 10-2021-0021500 A | 2/2021 |
| KR | 1020210030785 A | 3/2021 |

(Continued)

OTHER PUBLICATIONS

Search Report & Written Opinion (PCT/ISA/210, PCT/ISA/237) dated Jun. 13, 2022 by the International Searching Authority for International Application No. PCT/KR2022/003107.

*Primary Examiner* — Ted M Wang
(74) *Attorney, Agent, or Firm* — Sughrue Mion, PLLC

(57) ABSTRACT

Example embodiments include an electronic device and a method for operating an electronic device. The electronic device includes an ultra-wide band (UWB) antenna including directional antennas disposed on a rear surface of the electronic device and at least one omnidirectional antenna. The electronic device further includes a communication circuit configured to transmit and/or receive radio frequency (RF) signals of a frequency band designated to be used for UWB communication, through the UWB antenna, with an external electronic device. The electronic device further includes a processor configured to calculate a first distance value and a second distance value, and to determine, based on a distance difference between the first distance value and the second distance value, whether the external electronic
(Continued)

device exists within a field of view (FoV) indicating a specified angular range with respect to the direction to which the rear surface faces.

20 Claims, 13 Drawing Sheets

Related U.S. Application Data continuation of application No. PCT/KR2022/003107, filed on Mar. 4, 2022.

(58) Field of Classification Search
USPC .......................................................... 455/566
See application file for complete search history.

(56) References Cited

U.S. PATENT DOCUMENTS

| | | |
|---|---|---|
| 2015/0279103 A1 | 10/2015 | Naegle et al. |
| 2016/0119770 A1 | 4/2016 | Ryu et al. |
| 2017/0195615 A1* | 7/2017 | Han .......................... G09G 5/14 |
| 2019/0158340 A1 | 5/2019 | Zhang |
| 2020/0305142 A1 | 9/2020 | Jang et al. |
| 2021/0011147 A1 | 1/2021 | Va et al. |
| 2021/0384630 A1 | 12/2021 | Kim et al. |

FOREIGN PATENT DOCUMENTS

| | | |
|---|---|---|
| KR | 1020220005306 A | 1/2022 |
| WO | 2017/203209 A1 | 11/2017 |

* cited by examiner

ELECTRONIC DEVICE AND METHOD FOR SUPPORTING POSITIONING COMMUNICATION

CROSS-REFERENCE TO RELATED APPLICATIONS

This application is a Continuation application of U.S. application Ser. No. 17/708,597, filed on Mar. 30, 2022, which is a Continuation Application of International Application PCT/KR2022/003107 filed on Mar. 4, 2022, which claims benefit of priority from Korean Patent Application No. 10-2021-0055158, filed on Apr. 28, 2021, in the Korean Intellectual Property Office, the disclosures of which are incorporated herein in their entireties by reference.

BACKGROUND

1. Technical Field

Various embodiments of the present disclosure relate to a positioning technology using ultra-wide band (UWB) communication.

2. Description of the Related Art

An electronic device may transmit and receive messages to and from an external electronic device through a UWB antenna and measure an angle of arrival (AoA) and a distance between the external electronic device and the electronic device using the messages. Using the measured AoA and distance, the electronic device can find the position of the external electronic device. The AoA can be defined as an angle at which a radio frequency (RF) signal is incident on the UWB antenna of the electronic device when the electronic device receives the RF signal from the external electronic device. The electronic device may display, on a display, a captured image acquired by a camera to contain information indicating the position of the external electronic device.

When the external electronic device performing UWB communication with the electronic device exists within a field of view (FoV), there may be a high probability that the RF signal transmitted from the external electronic device arrives at the electronic device through a direct path. For example, if the display is disposed on a first surface (e.g., a front surface) of the electronic device and the UWB antenna is disposed on a second surface (e.g., a rear surface) opposite to the first surface, the FoV may be set to a specified angular range (e.g., about −60 degrees to +60 degrees) with respect to a direction to which the second surface faces. A communication environment in which the RF signal can directly arrive at the electronic device may be referred to as a line-of-sight (LoS) situation. In such an example, the position of the external electronic device measured using the distance and AoA obtained in the LoS situation may be accurate.

When the external electronic device exists outside the FoV, the probability that the RF signal directly arrives at the electronic device is relatively low, and the probability that the RF signal arrives at the electronic device via a multi-path due to reflection from an object (e.g., a metal object) may be relatively high. A communication environment in which the RF signal does not directly arrive at the electronic device but arrives at the electronic device after being reflected by a metal object may be referred to as a non-line-of-sight (NLoS) situation.

The electronic device may determine whether the external electronic device exists within the FoV, based on the AoA information. However, in the NLoS situation, the determination may be inaccurate only with the AoA information. For example, a phenomenon (e.g., a false positive (FP) phenomenon) in which the external electronic device is erroneously determined to exist within the FoV even though the external electronic device actually exists outside the FoV may occur in the NLoS situation. As a result, an error of informing the user about an incorrect position may occur.

SUMMARY

Various embodiments of the disclosure may provide an electronic device configured to determine whether an external electronic device performing positioning communication with the electronic device exists within the FoV.

The technical problems to be solved in the present disclosure are not limited to the above-mentioned technical problems, and those of ordinary skill in the art to which the disclosure pertains will clearly understand, from the following description, other technical problems not mentioned herein.

According to various embodiments, an electronic device may include a display disposed on a front surface of the electronic device, an ultra-wide band (UWB) antenna including directional antennas disposed on a rear surface opposite to the front surface and forming a radiation pattern in a direction to which the rear surface faces, and at least one omnidirectional antenna forming an omnidirectional radiation pattern compared to the directional antennas, a processor, a communication circuit configured to convert a message to be transmitted to an external electronic device received from the processor into a radio frequency (RF) signal of a frequency band designated to be used for UWB communication, and output the RF signal to the UWB antenna, and configured to convert an RF signal received from the external electronic device through the UWB antenna into a message, and output the message to the processor, and a memory operatively connected to the processor. The memory may store instructions that cause, when executed, the processor to calculate a first distance value, based on a first time at which a first message is received from the external electronic device through the UWB antenna, a second time at which a second message is transmitted to the external electronic device through the UWB antenna, a third time at which a third message is received from the external electronic device through at least one of the directional antennas of the UWB antenna, and time information received from the external electronic device through the UWB antenna, to calculate a second distance value, based on the first time, the second time, a fourth time at which the third message is received from the external electronic device through the at least one omnidirectional antenna of the UWB antenna, and the time information, and to, based on a distance difference between the first distance value and the second distance value, determine whether the external electronic device exists within a field of view (FoV) indicating a specified angular range with respect to the direction to which the rear surface faces.

According to various embodiments, an electronic device may include a display disposed on a front surface of the electronic device, an ultra-wide band (UWB) antenna including directional antennas disposed on a rear surface opposite to the front surface and forming a radiation pattern in a direction to which the rear surface faces, and at least one omnidirectional antenna forming an omnidirectional radiation pattern compared to the directional antennas, a processor, a communication circuit configured to convert a message to be transmitted to an external electronic device received from the processor into a radio frequency (RF) signal of a frequency band designated to be used for UWB communication, and output the RF signal to the UWB antenna, and configured to convert an RF signal received from the external electronic device through the UWB antenna into a message, and output the message to the processor, and a memory operatively connected to the processor. The memory may store instructions that cause, when executed, the processor to calculate a first distance value, based on a first time at which a first message is transmitted to the external electronic device through the UWB antenna, a second time at which a second message is received from the external electronic device through at least one of the directional antennas of the UWB antenna, and time information received from the external electronic device through the UWB antenna, to calculate a second distance value, based on the first time, a third time at which the second message is received from the external electronic device through the at least one omnidirectional antenna of the UWB antenna, and the time information, and to, based on a distance difference between the first distance value and the second distance value, determine whether the external electronic device exists within a field of view (FoV) indicating a specified angular range with respect to the direction to which the rear surface faces.

According to various embodiments, a method for operating an electronic device having an ultra-wide band (UWB) antenna including directional antennas and at least one omnidirectional antenna forming an omnidirectional radiation pattern compared to the directional antennas may include calculating a first distance value, based on a first time at which a first message is received from an external electronic device through the UWB antenna, a second time at which a second message is transmitted to the external electronic device through the UWB antenna, a third time at which a third message is received from the external electronic device through at least one of the directional antennas of the UWB antenna, and time information received from the external electronic device through the UWB antenna; calculating a second distance value, based on the first time, the second time, a fourth time at which the third message is received from the external electronic device through the at least one omnidirectional antenna of the UWB antenna, and the time information; and based on a distance difference between the first distance value and the second distance value, determining whether the external electronic device exists within a field of view (FoV) indicating a specified angular range with respect to a direction to which one surface of the electronic device, on which the directional antennas are disposed, faces.

According to various embodiments, a method for operating an electronic device having an ultra-wide band (UWB) antenna including directional antennas and at least one omnidirectional antenna forming an omnidirectional radiation pattern compared to the directional antennas may include calculating a first distance value, based on a first time at which a first message is transmitted to an external electronic device through the UWB antenna, a second time at which a second message is received from the external electronic device through at least one of the directional antennas of the UWB antenna, and time information received from the external electronic device through the UWB antenna; calculating a second distance value, based on the first time, a third time at which the second message is received from the external electronic device through the at least one omnidirectional antenna of the UWB antenna, and the time information; and based on a distance difference between the first distance value and the second distance value, determining whether the external electronic device exists within a field of view (FoV) indicating a specified angular range with respect to a direction to which one surface of the electronic device, on which the directional antennas are disposed, faces.

According to various embodiments, an electronic device can accurately. According to various aspects of the disclosure, an electronic device can determine whether an external electronic device performing positioning communication with the electronic device exists within the FoV. In addition, various effects explicitly or implicitly appreciated through the disclosure may be provided.

DETAILED DESCRIPTION

Figure 1:
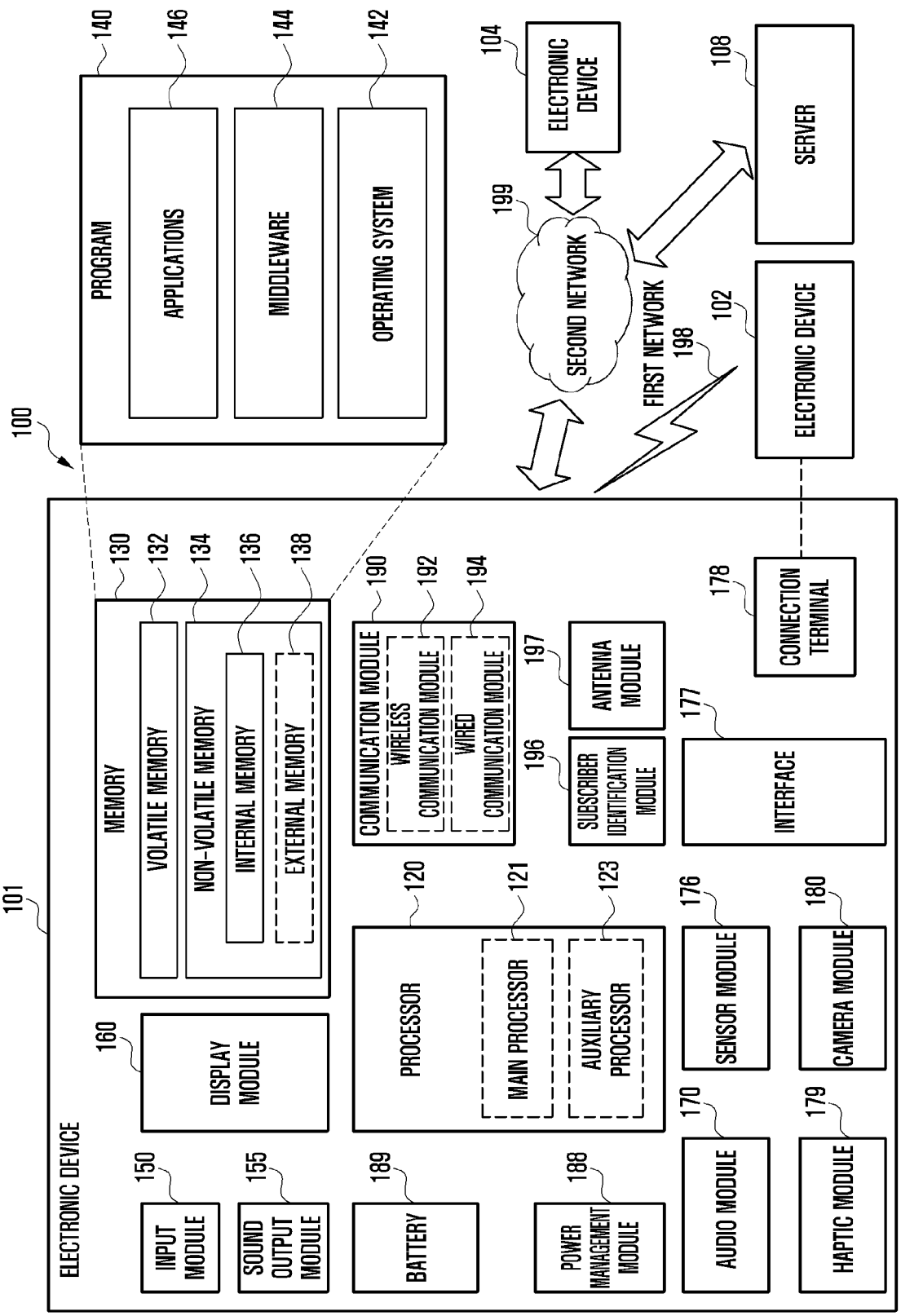
FIG. 1 is a block diagram of an electronic device in a network environment, according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
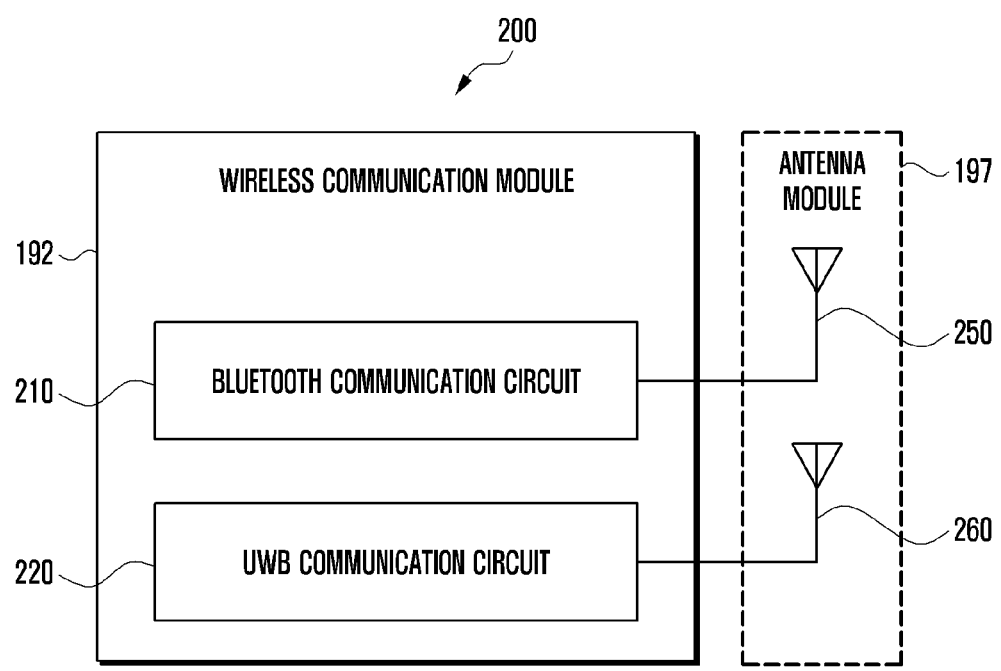
FIG. 2 is a block diagram illustrating a wireless communication module and an antenna module of an electronic device, according to various embodiments of the disclosure.

FIG. 2 is a block diagram illustrating a wireless communication module 192 and an antenna module 197 of an electronic device 101 according to various embodiments of the disclosure. With reference to FIG. 2, the wireless communication module 192 may include a Bluetooth communication circuit 210 and an ultra-wide band (UWB) communication circuit 220. The antenna module 197 may include a Bluetooth antenna 250 connected to the Bluetooth communication circuit 210 and a UWB antenna 260 connected to the UWB communication circuit 220. At least one function of the Bluetooth communication circuit 210 and the UWB communication circuit 220 may be controlled by the processor 120 (e.g., an application processor and/or a communication processor).

The Bluetooth communication circuit 210 may support the establishment of a Bluetooth communication channel (or session) corresponding to a frequency band designated to be used for Bluetooth (e.g., Bluetooth low energy (BLE)) communication among bands to be used for wireless communication with an external electronic device (e.g., the external electronic device 102 in FIG. 1). The Bluetooth communication circuit 210 may support the Bluetooth communication with the external electronic device through the Bluetooth communication channel. In case of transmission, the Bluetooth communication circuit 210 may convert a baseband signal, generated by the processor 120 (e.g., an application processor and/or a communication processor) and received from the processor 120, into a radio frequency (RF) signal of the Bluetooth band and then transmit the RF signal to the outside through the Bluetooth antenna 250. In case of reception, the Bluetooth communication circuit 210 may acquire an RF signal of the Bluetooth band (e.g., about 2.4 GHz) through the Bluetooth antenna 250, convert the acquired RF signal into a signal of baseband (e.g., several MHz or less), and then transmit the baseband signal to the processor 120.

The UWB communication circuit 220 may support the establishment of a UWB communication channel (or session) corresponding to a frequency band (e.g., about 3.1 to 10.6 GHz) designated to be used for UWB communication among bands to be used for wireless communication with the external electronic device (e.g., the external electronic device 102 in FIG. 1). The UWB communication circuit 220 may support the UWB communication with the external electronic device through the UWB communication channel. In case of transmission, the UWB communication circuit 220 may convert a baseband signal, generated by the processor 120 (e.g., an application processor and/or a communication processor) and received from the processor 120, into an RF signal of the UWB band and then transmit the RF signal to the outside through the UWB antenna 260. In case of reception, the UWB communication circuit 220 may acquire an RF signal of the UWB band through the UWB antenna 260, convert the acquired RF signal into a baseband signal, and then transmit the baseband signal to the processor 120. The wireless communication module 192 may further include a filter (e.g., a UWB band pass filter)(not shown) to selectively pass an RF signal of the UWB band in an RF signal received from the UWB antenna 260 and deliver the RF signal to the UWB communication circuit 220. Alternatively or additionally, the UWB antenna 260 may include a plurality of antennas. For example, the UWB antenna 260 may include a first antenna for transmitting/receiving an RF signal, a second antenna and/or a third antenna dedicated to receiving an RF signal.

According to various embodiments, Bluetooth communications may be used as a trigger for activating the UWB communication. For example, BLE may be used as a trigger to activate positioning communication as BLE may have a lower positioning accuracy than other short-distance communication technologies (e.g., UWB). However, BLE may consume less power and/or have a longer recognition distance (e.g., a distance at which the existence of the external electronic device 102 can be recognized) when compared to the other short-distance communication technologies. In some embodiments, the processor 120 may receive a signal (e.g., an advertising or broadcasting packet) for connection with the external electronic device 102 from the external electronic device 102 through the Bluetooth communication circuit 210. For example, the external electronic device 102, as an advertiser (or a broadcaster), may transmit a signal, and the electronic device 101, as an observer, may periodically scan the signal. The processor 120 may determine to activate the positioning communication using UWB when the received signal strength (e.g., received signal strength indicator (RSSI)) is greater than a predetermined threshold and/or when the received signal strength is getting stronger. Upon this determination, the processor 120 may establish the UWB communication channel (e.g., channel 5 (about 6.25 to 6.75 GHz), channel 9 (about 7.75 to 8.25 GHz)) with the external electronic device 102 using the UWB communication circuit 220. For example, when the UWB communication circuit 220 is in a disabled state (e.g., a sleep state or a power-off state), the processor 120 may switch the state of the UWB communication circuit 220 to an enabled state, based on the above determination, and establish the UWB communication channel with the external electronic device 102 using the UWB communication circuit 220. Then the processor 120 may perform the positioning communication with the external electronic device 102 through the established UWB communication channel. In other embodiments, the processor 120 may establish the BLE communication channel with the external electronic device 102 using the Bluetooth communication circuit 210. The processor 120 may determine to activate the positioning communication using UWB, based on the strength of the signal received from the external electronic device 102 through the established BLE communication channel (e.g., when the strength is greater than a predetermined threshold and/or when the signal strength is getting stronger). Upon this determination, the processor 120 may establish the UWB communication channel with the external electronic device 102 using the UWB communication circuit 220 and perform the positioning communication with the external electronic device 102 through the established UWB communication channel. In some embodiments, a communication technology (e.g., Wi-Fi) other than Bluetooth may also be used as a trigger for activating the positioning communication.

Various housing structures may be applied to the electronic device 101. For example, the electronic device 101 may have a bar-type housing structure. The bar-type housing structure may include a plate forming the front surface of the electronic device 101, a plate forming the rear surface of the electronic device 101, and a bezel structure forming a side surface surrounding a space between the front and rear surfaces. A display may be disposed on the front surface. In another example, the electronic device 101 may have a foldable housing structure that is divided into two housings about a folding axis. A first display area of a display (e.g., a flexible display) may be disposed in the first housing, and a second display area of the display may be disposed in the second housing. The foldable housing structure may be implemented as an in-folding type in which the first and second display areas face each other when the electronic device 101 is in a folded state. Alternatively or additionally, the foldable housing structure may be implemented as an out-folding type in which the first and second display areas face opposite directions when the electronic device 101 is in a folded state. In yet another example, the electronic device 101 may have a slidable (and/or rollable) housing structure. In such an example, the electronic device 101 may include a slidable housing structure having first and second housings, a roller (or a slider) for allowing a part of the second housing to be retracted into or drawn out from the first housing, and a flexible display. The display may be disposed in a space formed by the slidable housing structure. The display may include a first display area disposed adjacent to the first housing, and a second display area disposed in the inner space while surrounding the roller. Hereinafter, a surface on which the display is disposed (e.g., a surface on which the display area is visually exposed) may be referred to as the front surface of the electronic device. Alternatively or additionally, a surface opposite to the front surface may be referred to as the rear surface of the electronic device. Alternatively or additionally, a surface surrounding the space between the front and rear surfaces may be referred to as a side surface of the electronic device.

Figure 3A:
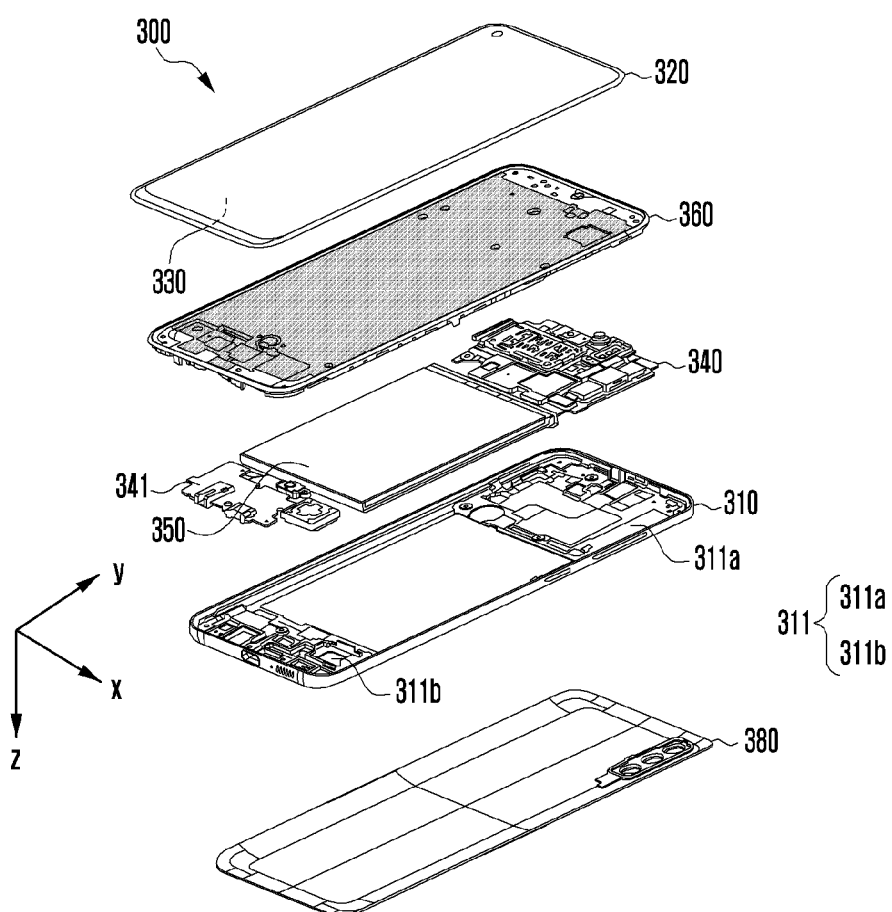
FIGS. 3A and 3B are diagrams illustrating the arrangement of an ultra-wide band (UWB) antenna in a mobile electronic device having a bar-type housing structure, according to various embodiments of the disclosure.
Figure 3B:
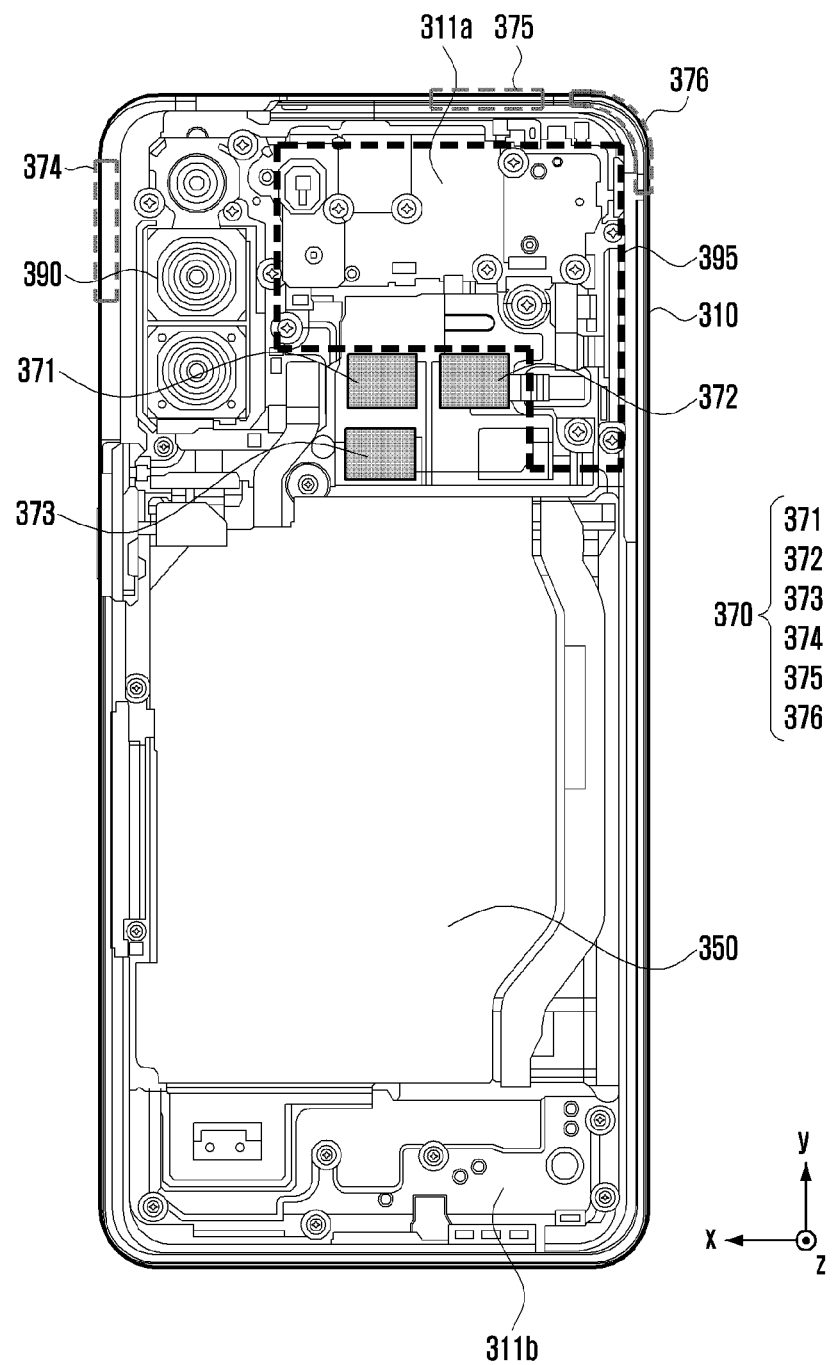

FIGS. 3A and 3B are diagrams illustrating the arrangement of a UWB antenna in a mobile electronic device 300 (e.g., the electronic device 101 in FIG. 1) according to various embodiments of the disclosure. With reference to FIGS. 3A and 3B, the electronic device 300 (e.g., the electronic device 101 in FIG. 1) may include a side bezel structure (or side frame) 310, a first support member (or first support frame) 311, a front plate (or front cover) 320, a display 330 (e.g., the display module 160 in FIG. 1), at least one printed circuit board 340 and 341, a battery 350 (e.g., the battery 189 in FIG. 1), a second support member (or second support frame) 360, a UWB antenna 370 (e.g., the UWB antenna 260 in FIG. 2), a rear plate (or rear cover) 380, and a camera module 390 (e.g., the camera module 180 in FIG. 1). The front plate 320 may form a first surface (or front surface) of the electronic device 300 facing a first direction, the rear plate 380 may form a second surface (or rear surface) of the electronic device 300 facing a second direction opposite to the first direction, and the side bezel structure 310 made of a combination of a metal (e.g., steel use stainless (SUS) or stainless steel (SS)) and a polymer may form a side surface surrounding the space between the first and second surfaces. According to some embodiments, a structure including the first surface, the second surface, and the side surface may be referred to as a housing (or housing structure). In some embodiments, at least one of the components of the electronic device 300 (e.g., the first support member 311 or the second support member 360) may be omitted, or any other component may be further included in the electronic device 300.

In some embodiments, the printed circuit boards 340 and 341 may be disposed to be supported by the first support member 311 and/or the second support member 360. The first support member 311 may be combined with the side bezel structure 310. The first support member 311 may include a structure (e.g., a metal or a polymer) extending from the side bezel structure 310. The first support member 311 may be formed of, for example, a metal and/or a non-metal material (e.g., a polymer). The display 330 may be coupled to one surface of the second support member 360, and the printed circuit boards 340 and 341 may be coupled to the other surface. The printed circuit boards 340 and 341 may be equipped with the processor 120, the memory 130, and/or the interface 177. According to some embodiments, the printed circuit boards 340 and 341 may include a main board 340 and a sub-board 341. The processor 120 may include, for example, one or more of a central processing unit, an application processor, a graphic processing unit, an image signal processor, a sensor hub processor, and a communication processor. The memory 130 may include, for example, a volatile memory or a non-volatile memory.

In some embodiments, the battery 350 may be disposed to be supported by the first support member 311 and/or the second support member 360. The battery 350 is a device for supplying power to at least one component of the electronic device 300 and may include, for example, a non-rechargeable primary battery, a rechargeable secondary battery, or a fuel cell. At least a portion of the battery 350 may be disposed on substantially the same plane as the printed circuit boards 340 and 341.

An antenna for the UWB communication may be disposed on the rear surface of the electronic device 300. For example, in case of channel 9 having a center frequency of about 8 GHz, a plurality of antennas for measuring the angle of arrival (AoA) may be disposed on the rear surface at regular intervals (e.g., about 18 mm). Another antenna may be disposed on the side surface of the electronic device 300. According to various embodiments, the antenna disposed on the side surface may be used for the UWB communication.

A directional antenna may be disposed on the rear surface. For example, the radiation pattern (or beam pattern) of the directional antenna disposed on the rear surface may have a strong directionality in a facing direction of the rear surface (the positive z-axis direction in FIG. 3). In some embodiments, an omnidirectional or non-directional antenna may be disposed on the rear surface. For example, the radiation pattern of the omnidirectional antenna disposed on the side surface may have a shape that spreads in the positive x-axis, positive y-axis, negative x-axis, and negative y-axis directions as well as in the positive z-axis direction. As shown in FIGS. 3A and 3B, the side surface of the electronic device 300 is opened in the negative z-axis direction compared to the rear surface. Thus, when then omnidirectional or non-directional antenna is disposed on the side surface, the radiation pattern may have a shape that spreads in all directions including the negative z-axis direction. As such, in a non-line-of-sight (NLoS) situation in which the external electronic device does not exist (e.g., is not located) within the FoV set based on the rear surface (e.g., the user puts the electronic device 300 on the table with the rear surface facing the table), there may be a high probability that the first RF signal received from the external electronic device through the omnidirectional antenna disposed on the side or rear surface is a signal that directly arrives at the electronic device 300 without an obstacle in the middle. Alternatively or additionally, in the NLoS situation, the probability that the first RF signal arriving at the directional antenna disposed on the rear surface is a signal that arrives directly at the electronic device 300 without an obstacle in the middle may be relatively low. In various embodiments, the electronic device 300 may determine whether the external electronic device exists (e.g., is located) within the FoV, based on a time difference between a time when the RF signal is received through the directional antenna disposed on the rear surface and a time when the RF signal is received through the omnidirectional antenna disposed on the side surface (or rear surface).

In some embodiments, the UWB antenna 370 (e.g., the UWB antenna 260 in FIG. 2) may include at least two directional antennas (e.g., patch antennas) 371, 372, and 373 disposed on the rear surface and at least one omnidirectional antenna 374, 375, and 376 disposed on the side surface. Alternatively or additionally, at least one omnidirectional antenna may be disposed on the rear surface (not shown). The at least one antenna 374, 375, and 376 disposed on the side surface may include a metal formed in the side bezel structure 310. The at least one antenna 374, 375, and 376 disposed on the side surface may include a laser direct structuring (LDS) structure formed using a laser. The at least two antennas 371, 372, and 373 disposed on the rear surface may be disposed between the first support member 311 and the rear plate 380. For example, the first support member 311 may include a main board support member 311*a* for supporting the main board 340 and a sub-board support member 311*b* for supporting the sub-board 341. When the rear surface is viewed as shown in FIG. 3B, the at least two antennas 371, 372, and 373 disposed on the rear surface may be fixed to the main board support member 311*a* without overlapping the camera module 390 and the battery 350. In the side bezel structure 310, a metal formed in a portion adjacent to the main board support member 311*a* may be used as the omnidirectional antenna for the UWB communication. For example, in FIG. 3B, among the UWB antennas 370, the omnidirectional antenna may include an antenna 374 adjacent to the left side of the main board support member 311*a* and forming a part of the left side of the side bezel structure 310, an antenna 375 adjacent to the upper side of the main board support member 311*a* and forming a part of the upper side of the side bezel structure 310, and an antenna 376 adjacent to the upper side of the main board support member 311*a* and forming the upper right corner of the side bezel structure 310. Each of the antennas 371, 372, 373, 374, 375, and 376 may be referred to as an antenna element. For example, the UWB antenna 370 may include the directional antenna elements 371, 372, and 373, and the omnidirectional antenna elements 374, 375, and 376.

Figure 4:
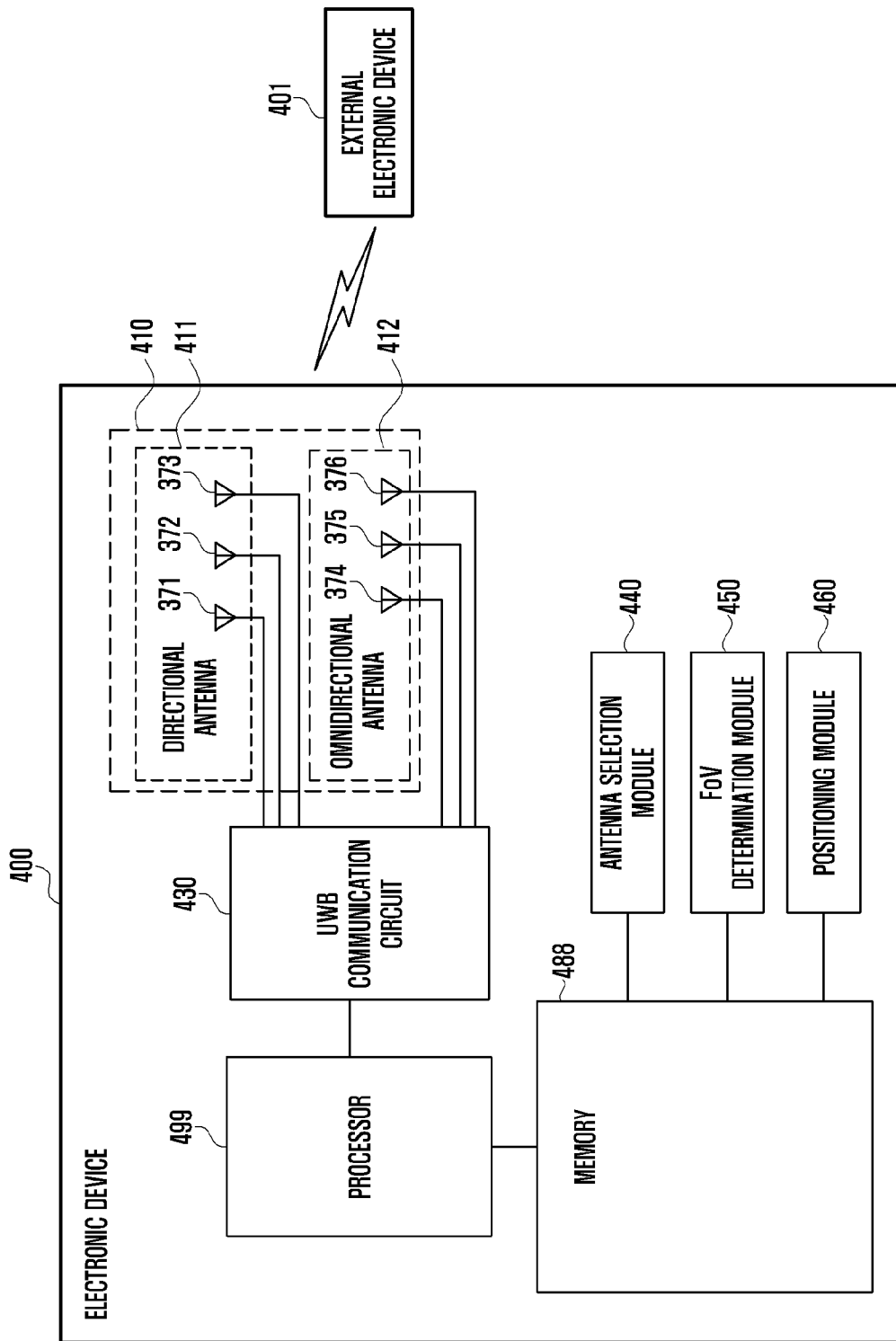
FIG. 4 is a block diagram illustrating an electronic device configured to determine whether an external electronic device exists within a field of view (FoV), according to various embodiments of the disclosure.
Figure 5A:
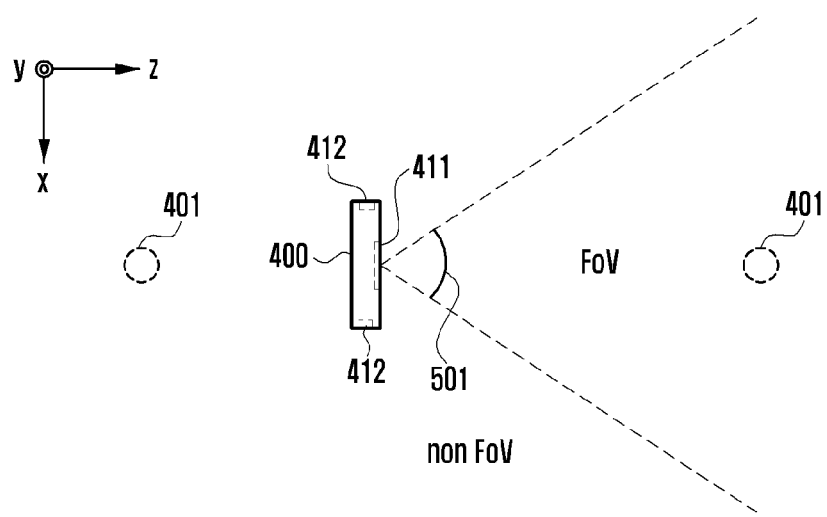
FIG. 5A is a conceptual diagram illustrating a FoV that is set based on a rear surface of an electronic device as shown in FIG. 4, according to various embodiments of the disclosure.
Figure 5B:
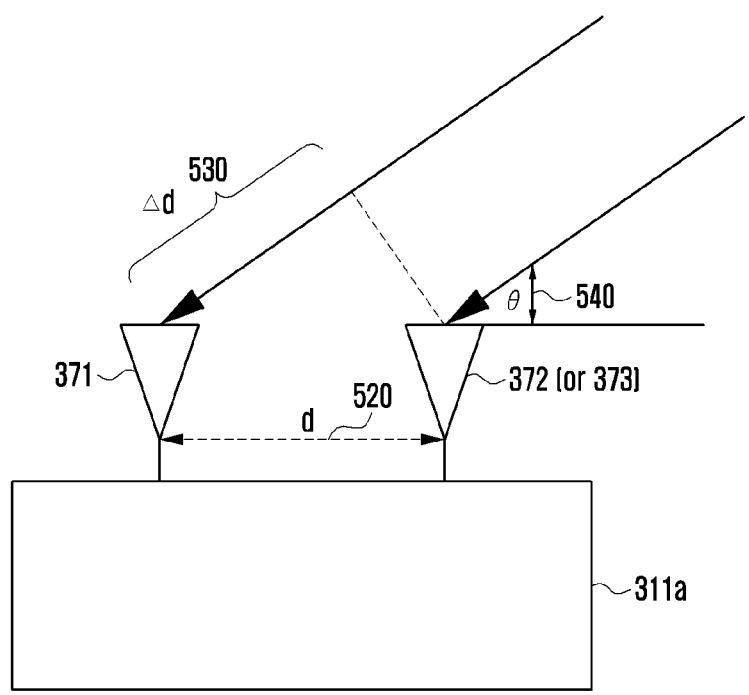
FIG. 5B is a diagram illustrating a method of measuring an angle of arrival (AoA) using directional antennas disposed on a rear surface of an electronic device, according to various embodiments of the disclosure.

FIG. 4 is a block diagram illustrating an electronic device 400 configured to determine whether an external electronic device 401 performing positioning communication with the electronic device 400 exists within a FoV according to various embodiments of the disclosure. FIG. 5A is a conceptual diagram illustrating the FoV that is set based on a rear surface of the electronic device 400 shown in FIG. 4. FIG. 5B is a diagram illustrating a method of measuring an AoA using directional antennas disposed on the rear surface of the electronic device 400. With reference to FIG. 4, the electronic device 400 (e.g., the electronic device 101 in FIG. 1) may include UWB antennas 410, a UWB communication circuit 430, a memory 488, and a processor 499. The above components of the electronic device 400 may be operatively or electrically connected to each other. The memory 488 (e.g., the memory 130 in FIG. 1) may include an antenna selection module 440, a FoV determination module 450, and a positioning module 460. For example, the antenna selection module 440, the FoV determination module 450, and the positioning module 460 may be stored as instructions in the memory 488 and executed by the processor 499 (e.g., the processor 120 in FIG. 1). At least one of the antenna selection module 440, the FoV determination module 450, and the positioning module 460 may be executed by a processor (e.g., the auxiliary processor 123) specialized for the UWB communication.

The UWB antennas 410 may include a directional antenna 411 and an omnidirectional antenna 412. The directional antenna 411 may include a patch antenna disposed on the rear surface of the electronic device 400. For example, the directional antenna 411 may include the antennas 371, 372, and 373 shown in FIG. 3. The omnidirectional antenna 412 may include a metal and/or an LDS structure constituting a portion of the side surface of the electronic device 400. For example, the omnidirectional antenna 412 may include the antennas 374, 375, and 376 shown in FIG. 3. The omnidirectional antenna 412 may include a metal and/or an LDS structure disposed on the rear surface of the electronic device 400. For example, the omnidirectional antenna may be additionally disposed on the main board support member 311*a* in a region 395 that does not overlap with the camera module 390 and the antennas 371, 372, and 373. The omnidirectional antenna may be additionally disposed on the sub-board support member 311*b*.

The UWB communication circuit 430 (e.g., the UWB communication circuit 220 in FIG. 2) may receive from the processor 499 a digital signal required for measuring the position of the external electronic device 401 (hereinafter, a positioning message) (e.g., a ranging control message (RCM), a ranging initiation message (RIM), a ranging response message (RRM), a ranging final message (RFM), and a measurement report message (MRM)), modulate the digital signal into an RF signal having a frequency belonging to a frequency band (e.g., about 3.1 to 10.6 GHz) designated to be used for the UWB communication, and output the RF signal to the UWB antennas 410. The UWB communication circuit 430 may receive an RF signal through the UWB antennas 410, demodulate the RF signal into a digital signal including a positioning message, and output the digital signal to the processor 499. The UWB communication circuit 430 may include a plurality of signal paths. The signal paths may include a transmit path (or transmit circuitry) and a plurality of receive paths (or receive circuitry). For example, the transmit path may include an amplifier circuit (e.g., a power amplifier (PA)) that amplifies the RF signal, and a conductive line that connects the amplifier circuit to an antenna (e.g., the second antenna 372) designated for transmission among the UWB antennas 410. The plurality of receive paths may include conductive lines connected to the antennas 371, 372, 373, 374, 375, and 376, respectively. Each of the receive paths may further include an amplifier circuit (e.g., a low noise amplifier (LNA)). The UWB communication circuit 430 may further include a switch circuit used to select an antenna to receive the RF signal from among the UWB antennas 410. For example, the switch circuit may connect a receive path corresponding to an antenna selected by the antenna selection module 440 to the processor 499 (or a modem for signal modulation/demodulation in the UWB communication circuit 430).

The antenna selection module 440 may select an antenna to receive the RF signal from the external electronic device 401 from among the UWB antennas 410. The antenna selection module 440 may be implemented as an application (e.g., the application 146 in FIG. 1). The antenna selection module 440 may select an antenna to be used for the positioning communication, based on a specified value (e.g., configuration value) indicating a combination of antennas. For example, the antenna selection module 440 may select an antenna for AoA measurement, distance measurement, or FoV determination from among the UWB antennas 410.

In some embodiments, the antenna selection module 440 may select the directional antenna 411 as an antenna used to measure the AoA of the RF signal received from the external electronic device 401. For example, with reference to FIG. 3B, the antenna selection module 440 may select the antennas 371 and 372 aligned in the x-axis direction as an antenna used to measure an angle in the x-axis direction (e.g., an azimuth angle or a left-right angle). The antenna selection module 440 may select the antennas 371 and 373 aligned in the y-axis direction as an antenna used to measure an angle in the y-axis direction (e.g., an elevation angle or an up-down angle).

In some embodiments, the memory 488 may store location information about at least one antenna (e.g., the directional antenna 411 and/or the omnidirectional antenna 412) of the electronic device 400 and orientation information (e.g., a landscape mode or a portrait mode) of the electronic device 400, and the antenna selection module 440 may select an antenna for measuring the AoA of the RF signal, based on the location information about the antenna and the orientation information of the electronic device 400.

In some embodiments, the antenna selection module 440 may select the directional antenna 411 and/or the omnidirectional antenna 412 as an antenna used to measure a distance between the electronic device 400 and the external electronic device 401.

With reference to FIG. 5A, in some embodiments, the antenna selection module 440 may select the directional antenna 411 and the omnidirectional antenna 412 as antennas used to determine whether the external electronic device 401 exists within the FoV. For example, the antenna selection module 440 may select at least one of the antennas 371, 372, and 373 and at least one of the antennas 374, 375, and 376 as antennas for determining the FoV. A field of view (FoV) (e.g., an observation region) may be defined as a region existing within a specified angular range 501 with respect to a direction (the z-axis direction in FIG. 5) to which the rear surface of the electronic device 400 faces.

The FoV determination module 450 may identify a time when the positioning message is received from the external electronic device 401 through the directional antenna 411, and a time when the positioning message is received from the external electronic device 401 through the omnidirectional antenna 412. Using a difference (e.g., a time difference) between the two identified times, the FoV determination module 450 may determine whether the external electronic device 401 exists within the FoV.

In some embodiments, when the time difference is equal to or less than a specified time reference value, the FoV determination module 450 may determine that the external electronic device 401 exists within the FoV. When the time difference exceeds the time reference value, the FoV determination module 450 may determine that the external electronic device 401 is outside the FoV.

In some embodiments, the FoV determination module 450 may calculate the distance between the electronic device 400 and the external electronic device 401 using the time when the positioning message is received from the external electronic device 401 through the directional antenna 411. The FoV determination module 450 may calculate the distance between the electronic device 400 and the external electronic device 401 using the time when the positioning message is received from the external electronic device 401 through the omnidirectional antenna 412. When a difference between the two calculated distances (distance difference) is equal to or less than a specified distance reference value, the FoV determination module 450 may determine that the external electronic device 401 exists within the FoV. When the distance difference exceeds the distance reference value, the FoV determination module 450 may determine that the external electronic device 401 exists outside the FoV.

In some embodiments, the FoV determination module 450 may calculate the distance between the electronic device 400 and the external electronic device 401 using the time when the positioning message is received from the external electronic device 401 through the directional antenna 411. The FoV determination module 450 may calculate the distance between the electronic device 400 and the external electronic device 401 using the time when the positioning message is received from the external electronic device 401 through one (e.g., the antenna 374 formed on the left side when viewed in FIG. 3B) of the elements of the omnidirectional antenna 412. The FoV determination module 450 may calculate the distance between the electronic device 400 and the external electronic device 401 using the time when the positioning message is received from the external electronic device 401 through another (e.g., the antenna 375 formed on the upper side when viewed in FIG. 3B) of the elements of the omnidirectional antenna 412. If a difference between the minimum value and the maximum value among the calculated distance values is equal to or less than a specified distance reference value, the FoV determination module 450 may determine that the external electronic device 401 exists (e.g., is located) within the FoV. If the difference between the minimum value and the maximum value exceeds the distance reference value, the FoV determination module 450 may determine that the external electronic device 401 exists (e.g., is located) outside the FoV.

With reference to FIG. 5B, from the distance information stored in advance in the memory 488, the positioning module 460 may know a distance (d) 520 between the first antenna 371 and the second antenna 372 (or the third antenna 373) disposed on the main board support member 311a. When the RF signal transmitted by the external electronic device arrives at the electronic device 400, the positioning module 460 may calculate a difference (Δd) 530 between a distance from the external electronic device to the first antenna 371 and a distance from the external electronic device to the second antenna 372 using Equation 1 below. In Equation 1, 'θ' may denote the AoA 540 to be obtained.

$$\Delta d = d \cdot \cos\theta \qquad \text{[Eq. 1]}$$

The positioning module 460 may calculate a phase difference (ΔΦ) of the RF signal arriving at the first antenna 371 and the second antenna 372 using Equation 2 below. In Equation 2, 'λ' may be the wavelength of the RF signal.

$$\Delta\Phi = \frac{2\pi}{\lambda} \cdot \Delta d \qquad \text{[Eq. 2]}$$

The positioning module 460 may calculate the AoA 540 using Equation 3 below derived from Equations 1 and 2.

$$\theta = \cos^{-1}\frac{\Delta\Phi}{2\pi d/\lambda} \qquad \text{[Eq. 3]}$$

When the external electronic device 401 has been determined to exist within the FoV, the positioning module 460 may estimate the position of the external electronic device 401 using the measured distance (d) 520 and AoA 540. The processor 499 may add information indicating the estimated position in an image obtained using a camera and then display the image on the display.

In some embodiments, when the external electronic device 401 has been determined to not exist within the FoV, the processor 499 may display, on the display, information indicating that the external electronic device 401 exists outside the FoV. For example, information estimated as the position of the external electronic device 401 may be displayed on the display.

Figure 6:
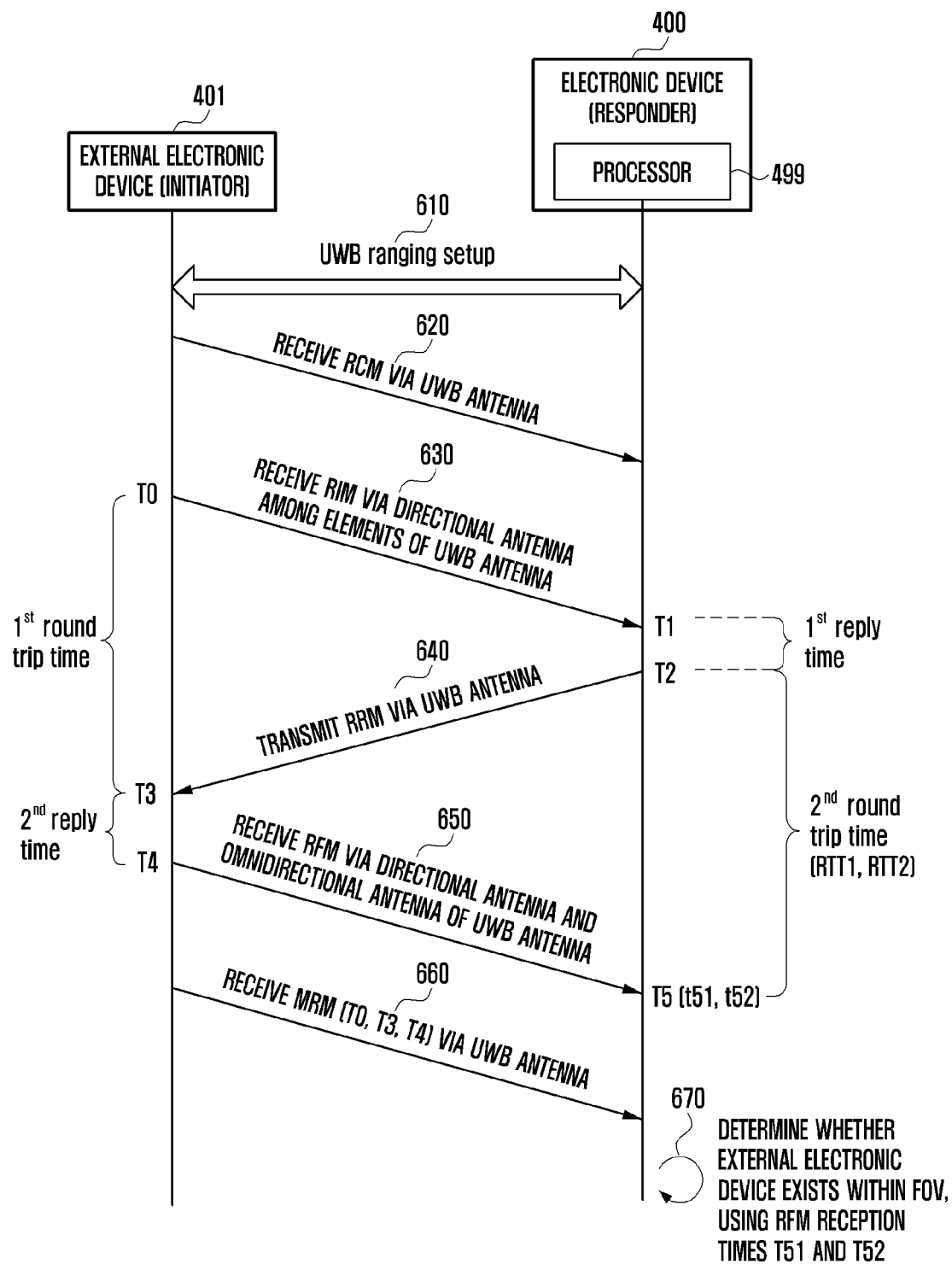
FIG. 6 illustrates operations of a processor using double side (DS)-two way ranging (TWR), according to various embodiments of the disclosure.

FIG. 6 illustrates operations of a processor 499 using double side (DS)-two way ranging (TWR) according to various embodiments of the disclosure.

At operation 610, the processor 499 may perform a UWB ranging setup process for the external electronic device 401 through wireless communication with the external electronic device 401. In some embodiments, the processor 499 may determine to activate UWB communication using the UWB communication circuit 430, based on a signal received from the external electronic device 401 through a BLE communication channel established between the electronic device 400 and the external electronic device 401. For example, when the strength of a signal received through a short-range communication module (e.g., BLE, Bluetooth, or WiFi) exceeds a specified threshold, or the signal strength is getting stronger, or both of the above conditions are satisfied, the processor 499 may determine the activation of the UWB communication. Upon this determination, the processor 499 may exchange UWB session information (e.g., wireless communication channel, session ID, and data rate) necessary for establishing a UWB communication channel with the external electronic device 401 through the BLE communication channel. Additionally, the processor 499 may also determine a UWB communication cycle by transmitting and receiving information related to the UWB communication cycle to and from the external electronic device 401 through the BLE communication channel. Using the exchanged UWB session information, the processor 499 may establish the UWB communication channel with the external electronic device 401.

At operation 620, the processor 499 may receive a ranging control message (RCM) from the external electronic device 401 through the UWB antenna 410 via the UWB communication channel. For example, the processor 499 may receive the RCM including information indicating that a positioning scheme is DS-TWR, from the external electronic device 401 through the UWB communication channel. The DS-TWR related information may include information indicating that the positioning communication is performed in such a way that a device set as a responder (or controller) receives a ranging initiation message (RIM) and a ranging final message (RFM) from a device set as an initiator (or controlee) and also the initiator receives a ranging response message (RRM) from the responder. Alternatively or additionally, the DS-TWR related information may include information indicating that the external electronic device 401 is set as the initiator and the electronic device 400 is set as the responder.

At operation 630, the processor 499 may receive the RIM from the external electronic device 401 set as the initiator through the directional antenna 411 among the elements of the UWB antenna 410. The processor 499 may identify an RIM reception time T1 from the directional antenna 411, and store the RIM reception time T1 in the memory 488. For example, for AoA measurement, the processor 499 may receive the RIMs through two of the elements 371, 372, and 373 of the directional antenna 411, respectively. Then, the processor 499 may identify a reception time t11 from the first directional antenna element and a reception time t12 from the second directional antenna element, and determine a smaller value (and/or an average value) between t11 and t12 as a representative value T1 of t11 and t12.

In another example, the processor 499 may receive the RIMs via the elements 371, 372, and 373 of the directional antenna 411, respectively. Then, the processor 499 may identify a reception time t11 from the first directional antenna element, a reception time t12 from the second directional antenna element, and a reception time t13 from the third directional antenna element, and determine the smallest value (and/or an average value and/or a median value) among t11, t12, and t13 as a representative value T1 of t11, t12, and t13.

At operation 640, the processor 499 may transmit the RRM to the external electronic device 401 through the UWB antenna 410 in response to the RIM reception. The processor 499 may identify an RRM transmission time T2 and store the RRM transmission time T2 in the memory 488. The processor 499 may store a first reply time as a difference between T1 and T2 in the memory 488. The external electronic device 401 may transmit the RFM to the electronic device 400 in response to the RRM reception.

At operation 650, the processor 499 may receive the RFM from the external electronic device 401 through each of the directional antenna 411 and the omnidirectional antenna 412 of the UWB antenna 410. For example, the processor 499 may receive the RFM via one of the elements 371, 372, and 373 of the directional antenna 411. The processor 499 may receive the RFM via one of the elements 374, 375, and 375 of the omnidirectional antenna 412. The processor 499 may identify an RFM reception time t51 from the directional antenna 411 and store the RFM reception time t51 in the memory 488. The processor 499 may identify an RFM reception time t52 from the omnidirectional antenna 412 and store the RFM reception time t52 in the memory 488. The processor 499 may determine a smaller value (and/or an average value) between t51 and t52 as a representative value T5 of t51 and t52. The processor 499 may store, in the memory 488, a first value 'RTT1' of a second round trip time as a difference between T2 and t51 and a second value 'RTT2' of the second round trip time as a difference between T2 and t52.

In another example, the processor 499 may receive the RFM via one of the elements 371, 372, and 373 of the directional antenna 411. The processor 499 may receive the RFM via two of the elements 374, 375, and 375 of the omnidirectional antenna 412. The processor 499 may identify the RFM reception time t51 from the directional antenna 411, an RFM reception time t521 from the first omnidirectional antenna element, and an RFM reception time t522 from the second omnidirectional antenna element, and store t51, t521, and t522 in the memory 488. The processor 499 may determine a smaller value (and/or an average value) between t521 and t522 as a representative value t52 of t521 and t522. The processor 499 may determine a smaller value (and/or an average value) between t51 and t52 as a representative value T5 of t51 and t52. The processor 499 may store, in the memory 488, the first value 'RTT1' of the second round trip time as a difference between T2 and t51 and the second value 'RTT2' of the second round trip time as a difference between T2 and t52.

At operation 660, from the external electronic device 401 through the UWB antenna 410, the processor 499 may receive an MRM including information (e.g., a timestamp value indicating T0) indicating a time T0 when the external electronic device 401 transmits the RIM, information indicating a time T3 when the external electronic device 401 receives the RRM, and information indicating a time T4 when the external electronic device 401 transmits the RFM. The processor 499 may receive the MRM including information indicating, instead of T0, T3, and T4, a first round trip time as a difference between T0 and T3 and a second reply time as a difference between T3 and T4 from the external electronic device 401 through the UWB antenna 410.

At operation 670, using t51 and t52, the processor 499 may determine whether the external electronic device 401 exists within the FoV. When the external electronic device 401 has been determined to exist within the FoV, the processor 499 may calculate the AoA using the received RIM.

In an example of the operation 670, the processor 499 may obtain a first distance value by inputting T0, T1, T2, T3, T4, and T5 (corresponding to t51) into Equation 4 below. The processor 499 may obtain a second distance value by inputting t52 into Equation 4 instead of t51. When a distance difference between the first distance value and the second distance value is equal to or less than a specified distance reference value, the processor 499 may determine that the external electronic device 401 exists within the FoV. When the distance difference exceeds the distance reference value, the processor 499 may determine that the external electronic device 401 is outside the FoV.

$$ToF = \frac{1st\,RTT(T3-T0) - 1st\text{ reply time}(T2-T1) + 2nd\,RTT(T5-T2) - 2nd\text{ reply time}(T4-T3)}{4} \quad \text{[Eq. 4]}$$

$$D(\text{distance}) = ToF \times \text{Speed of light}$$

In some embodiments, from the external electronic device 401, the processor 499 may receive information indicating T0 through the RIM and information indicating T3 and T4 through the RFM. Alternatively or additionally, the processor 499 may receive information indicating T0, T3, and T4 from the external electronic device 401 through the RFM. Alternatively or additionally, the processor 499 may receive information indicating the first round trip time and the second reply time from the external electronic device 401 through the RFM. According to such embodiments, the operation 660 may be omitted.

In other embodiments of the operation 630, the processor 499 may receive the RIM from the external electronic device 401 through the directional antenna 411 and the omnidirectional antenna 412 of the UWB antenna 410. For example, the processor 499 may receive the RIM via at least two of the elements 371, 372, and 373 of the directional antenna 411. The processor 499 may receive the RIM via one of the elements 374, 375, and 376 of the omnidirectional antenna 412. The processor 499 may store a reception time t11 from the first directional antenna element, a reception time t12 from the second directional antenna element, and a reception time t13 from the omnidirectional antenna element in the memory 488. The processor 499 may determine the smallest value (and/or an average value or a median value) among t11, t12, and t13 as a representative value T1 of t11, t12, and t13.

In some embodiments, at least one of the above operations 610, 620, 630, 640, 650, and 660 may be performed, on behalf of the processor 499, by the UWB communication circuit 430 implemented as a chipset. For example, the UWB communication circuit 430 may obtain the first distance value by inputting T0, T1, T2, T3, T4, and T5 (corresponding to t51) into Equation 1 above. The UWB communication circuit 430 may obtain the second distance value by inputting t52 into Equation 1 instead of t51. The UWB communication circuit 430 may deliver the obtained distance values to the processor 499.

In some embodiments, the processor 499 may include a first processor that performs the operations 610, 620, 630, 640, 650, and 660, and a second processor that performs the operation 670. For example, the first processor may include a communication processor embedded in a chipset together with the UWB communication circuit 430. The second processor may include an application processor.

Figure 7:
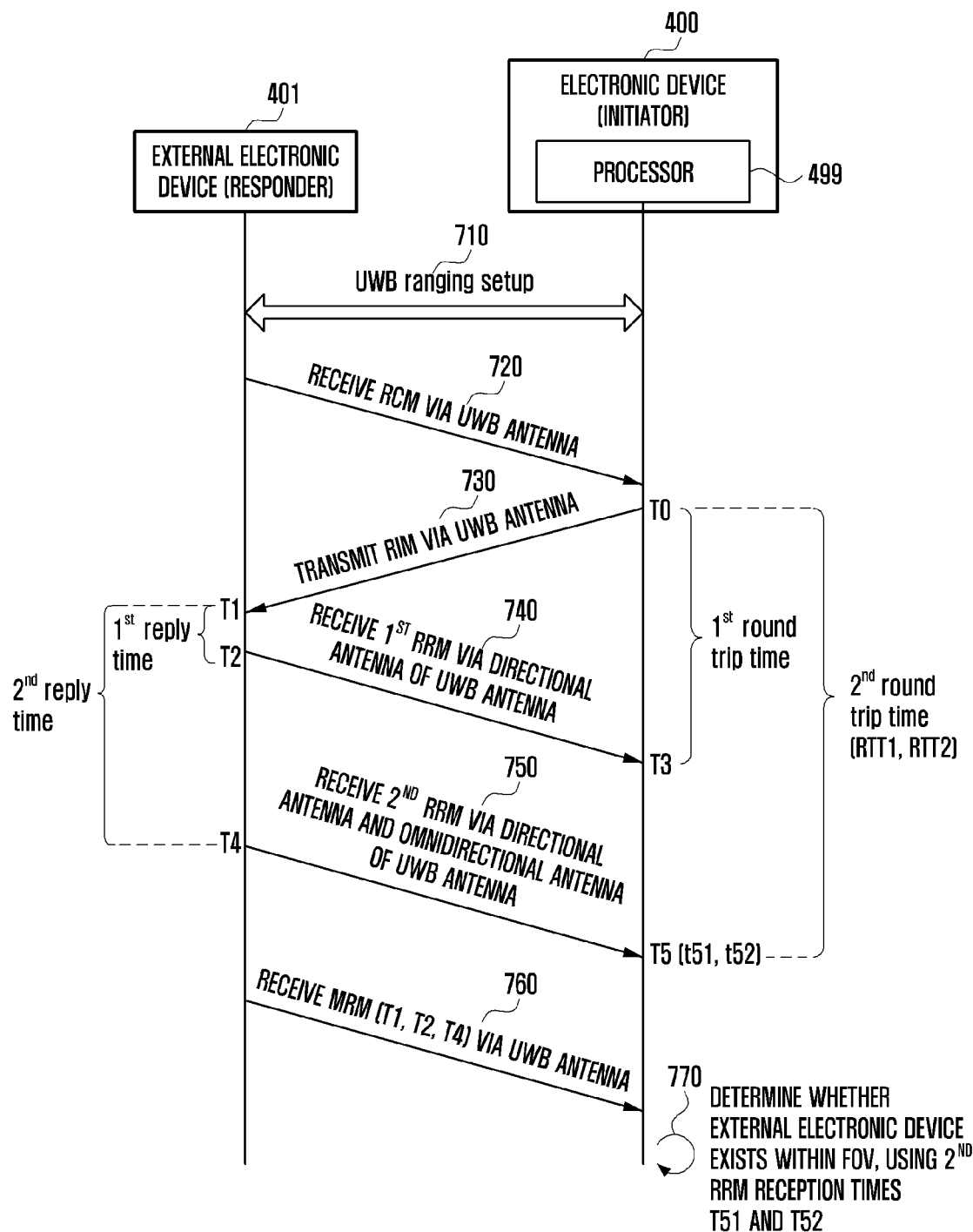
FIG. 7 illustrates first operations of a processor using a single side (SS)-TWR, according to various embodiments of the disclosure.

FIG. 7 illustrates operations of a processor 499 using a single side (SS)-TWR according to various embodiments of the disclosure.

At operation 710 (e.g., the operation 610), the processor 499 may perform a UWB ranging setup process for the external electronic device 401 through wireless communication with the external electronic device 401.

At operation 720, the processor 499 may receive a ranging control message (RCM) from the external electronic device 401 through the UWB antenna 410 via the UWB communication channel. For example, the processor 499 may receive the RCM including information indicating that a positioning scheme is SS-TWR, from the external electronic device 401 through the UWB communication channel. This SS-TWR related information may include information indicating that the positioning communication is performed in such a way that a device set as a responder receives a ranging initiation message (RIM) from a device set as an initiator and also the responder transmits a ranging response message (RRM) to the initiator twice in sequence. The SS-TWR related information may also include information indicating that the electronic device 400 is set as the initiator and the external electronic device 401 is set as the responder.

At operation 730, the processor 499 of the electronic device 400 set as the initiator may transmit the RIM to the external electronic device 401 through the UWB antenna 410. The processor 499 may identify a time T0 when the RIM is transmitted to the external electronic device 401, and store the time T0 in the memory 488. The external electronic device 401 may sequentially transmit a first RRM and a second RRM to the electronic device 400 in response to RIM reception.

At operation 740, the processor 499 may receive the first RRM from the external electronic device 401 through the directional antenna 411. The processor 499 may identify a first RRM reception time T3 from the directional antenna 411 and store the first RRM reception time T3 in the memory 488. For example, for AoA measurement, the processor 499 may receive the first RRMs through two of the elements 371, 372, and 373 of the directional antenna 411, respectively. Then, the processor 499 may identify a reception time t31 from the first directional antenna element and a reception time t32 from the second directional antenna element, and determine a smaller value (and/or an average value) between t31 and t32 as a representative value T3 of t31 and t32.

In another example, the processor 499 may receive the first RRMs via the elements 371, 372, and 373 of the directional antenna 411, respectively. Then, the processor 499 may identify a reception time t31 from the first directional antenna element, a reception time t32 from the second directional antenna element, and a reception time t33 from the third directional antenna element, and determine the smallest value (or an average value or a median value) among t31, t32, and t33 as a representative value T3 of t31, t32, and t33.

At operation 750, the processor 499 may receive the second RRM from the external electronic device 401 through each of the directional antenna 411 and the omnidirectional antenna 412. For example, the processor 499 may receive the second RRM via one of the elements 371, 372, and 373 of the directional antenna 411. The processor 499 may receive the second RRM via one of the elements 374, 375, and 375 of the omnidirectional antenna 412. The processor 499 may identify a second RRM reception time t51 from the directional antenna 411 and store the second RRM reception time t51 in the memory 488. The processor 499 may identify a second RRM reception time t52 from the omnidirectional antenna 412 and store the second RRM reception time t52 in the memory 488. The processor 499 may determine a smaller value (and/or an average value) between t51 and t52 as a representative value T5 of t51 and t52. The processor 499 may store, in the memory 488, a first value 'RTT1' of a second round trip time as a difference between T0 and t51 and a second value 'RTT2' of the second round trip time as a difference between T0 and t52.

In another example, the processor 499 may receive the second RRM via one of the elements 371, 372, and 373 of the directional antenna 411. The processor 499 may receive the second RRM via two of the elements 374, 375, and 375 of the omnidirectional antenna 412. The processor 499 may identify the second RRM reception time t51 from the directional antenna 411, a second RRM reception time t521 from the first omnidirectional antenna element, and a second RRM reception time t522 from the second omnidirectional antenna element, and store t51, t521, and t522 in the memory 488. The processor 499 may determine a smaller value (and/or an average value) between t521 and t522 as a representative value t52 of t521 and t522. The processor 499 may determine a smaller value (and/or an average value) between t51 and t52 as a representative value T5 of t51 and t52. The processor 499 may store, in the memory 488, the first value 'RTT1' of the second round trip time as a difference between T0 and t51 and the second value 'RTT2' of the second round trip time as a difference between T0 and t52.

At operation 760, from the external electronic device 401 through the UWB antenna 410, the processor 499 may receive an MRM including information indicating a time T1 when the external electronic device 401 receives the RIM, information indicating a time T2 when the external electronic device 401 transmits the first RRM, and information indicating a time T4 when the external electronic device 401 transmits the second RRM. The processor 499 may receive the MRM including information indicating, instead of T1, T2, and T4, a first reply time as a difference between T1 and T2 and a second reply time as a difference between T1 and T4 from the external electronic device 401 through the UWB antenna 410.

At operation 770, using t51 and t52, the processor 499 may determine whether the external electronic device 401 exists within the FoV.

In an example of the operation 770, the processor 499 may obtain a first distance value by inputting T0, T1, T2, T4, and T5 (corresponding to t51) into Equation 5 below. The processor 499 may obtain a second distance value by inputting t52 into Equation 5 instead of t51. When a distance difference between the first distance value and the second distance value is equal to or less than a specified distance reference value, the processor 499 may determine that the external electronic device 401 exists within the FoV. When the distance difference exceeds the distance reference value, the processor 499 may determine that the external electronic device 401 is outside the FoV.

$$ToF = \frac{2nd\ RTT(T5 - T0) - 2nd\ \text{reply time}(T4 - T1)}{2} \quad \text{[Eq. 5]}$$

$D(\text{distance}) = ToF \times \text{speed of light}$

In some embodiments, from the external electronic device 401, the processor 499 may receive information indicating T1 and T2 through the first RRM and information indicating T4 through the second RRM. Alternatively or additionally, the processor 499 may receive information indicating T0, T2, and T4 from the external electronic device 401 through the second RRM. Alternatively or additionally, the processor 499 may receive information indicating the first reply time and the second reply time from the external electronic device 401 through the second RRM. According to such embodiments, the operation 760 may be omitted.

In some embodiments, at least one of the above operations 710, 720, 730, 740, 750, and 760 may be performed, on behalf of the processor 499, by the UWB communication circuit 430 implemented as a chipset. For example, the UWB communication circuit 430 may obtain the first distance value by inputting T0, T1, T4, and T5 (corresponding to t51) into Equation 2 above. The UWB communication circuit 430 may obtain the second distance value by inputting t52 into Equation 2 instead of t51. The UWB communication circuit 430 may deliver the obtained distance values to the processor 499.

In some embodiments, the processor 499 may include a first processor that performs the operations 710, 720, 730, 740, 750, and 760, and a second processor that performs the operation 770. For example, the first processor may include a communication processor embedded in a chipset together with the UWB communication circuit 430. The second processor may include an application processor.

Figure 8:
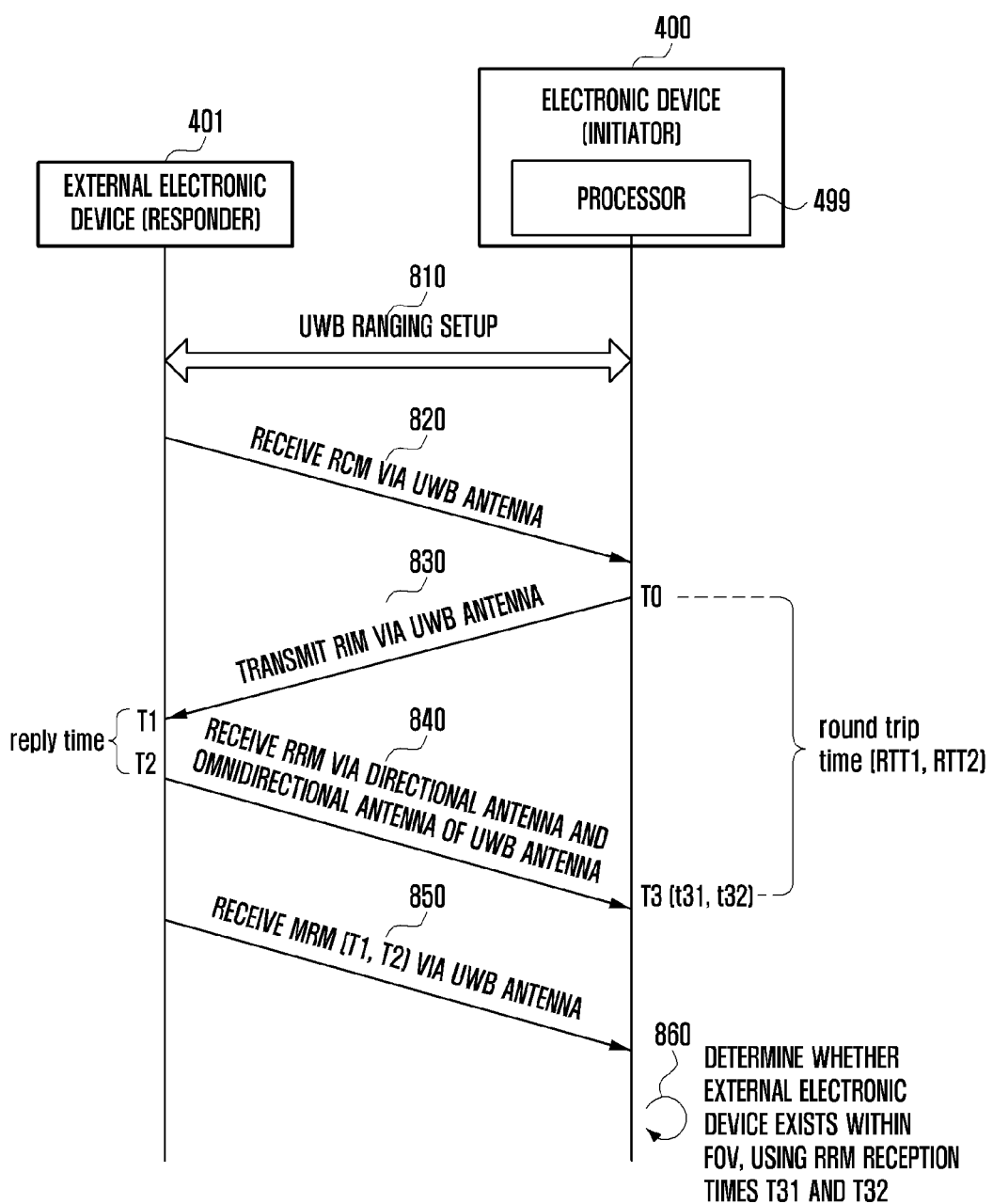
FIG. 8 illustrates second operations of a processor using SS-TWR, according to various embodiments of the disclosure.

FIG. 8 illustrates operations of a processor 499 using SS-TWR according to various embodiments of the disclosure.

At operation 810 (e.g., the operation 610), the processor 499 may perform a UWB ranging setup process for the external electronic device 401 through wireless communication with the external electronic device 401.

At operation 820, the processor 499 may receive a ranging control message (RCM) from the external electronic device 401 through the UWB antenna 410 via the UWB communication channel. For example, the processor 499 may receive the RCM including information indicating that a positioning scheme is SS-TWR, from the external electronic device 401 through the UWB communication channel. This SS-TWR related information may include information indicating that the positioning communication is performed in such a way that a device set as a responder receives a ranging initiation message (RIM) from a device set as an initiator and also the responder transmits a ranging response message (RRM) to the initiator once. The SS-TWR related information may also include information indicating that the electronic device 400 is set as the initiator and the external electronic device 401 is set as the responder.

At operation 830, the processor 499 of the electronic device 400 set as the initiator may transmit the RIM to the external electronic device 401 through the UWB antenna 410. The processor 499 may identify a time T0 when the RIM is transmitted to the external electronic device 401, and store the time T0 in the memory 488. The external electronic device 401 may transmit the RRM to the electronic device 400 in response to RIM reception.

At operation 840, the processor 499 may receive the RRM from the external electronic device 401 through each of the directional antenna 411 and the omnidirectional antenna 412.

In an example of the operation 840, the processor 499 may receive the RRM via one of the elements 371, 372, and 373 of the directional antenna 411. The processor 499 may receive the RRM via one of the elements 374, 375, and 375 of the omnidirectional antenna 412. The processor 499 may identify an RRM reception time t31 from the directional antenna 411 and store RRM reception time t31 in the memory 488. The processor 499 may identify an RRM reception time t32 from the omnidirectional antenna 412 and store the RRM reception time t32 in the memory 488. The processor 499 may determine a smaller value (or an average value) between t31 and t32 as a representative value T3 of t31 and t32. The processor 499 may store, in the memory 488, a first value 'RTT1' of a round trip time as a difference between T0 and t31 and a second value 'RTT2' of the round trip time as a difference between T0 and t32. This example may be performed in case that AoA measurement is not required (e.g., in case of providing only the distance between the two devices 400 and 401 to the user of the electronic device 400 without a need to provide the exact position of the external electronic device 401).

In another example of the operation 840, the processor 499 may receive the RRM via one of the elements 371, 372, and 373 of the directional antenna 411. The processor 499 may receive the RRM via two of the elements 374, 375, and 375 of the omnidirectional antenna 412. The processor 499 may identify the RRM reception time t31 from the directional antenna 411, an RRM reception time t321 from the first omnidirectional antenna element, and an RRM reception time t322 from the second omnidirectional antenna element, and store t31, t321, and t322 in the memory 488. The processor 499 may determine a smaller value (and/or an average value) between t321 and t322 as a representative value t32 of t321 and t322. The processor 499 may determine a smaller value (and/or an average value) between t31 and t32 as a representative value T3 of t31 and t32. The processor 499 may store, in the memory 488, the first value 'RTT1' of the round trip time as a difference between T0 and t31 and the second value 'RTT2' of the round trip time as a difference between T0 and t32. This example may be performed in case that AoA measurement is not required.

In yet another example of the operation 840, the processor 499 may receive the RRM via at least two of the elements 371, 372, and 373 of the directional antenna 411. The processor 499 may receive the RRM via one of the elements 374, 375, and 375 of the omnidirectional antenna 412. The processor 499 may store, in the memory 488, a reception time t311 from the first directional antenna element, a reception time t312 from the second directional antenna element, and a reception time t32 from the omnidirectional antenna element. The processor 499 may determine a smaller value (and/or an average value) between t311 and t312 as a representative value t31 of t311 and t312. The processor 499 may determine a smaller value (or an average value) between t31 and t32 as a representative value T3 of t31 and t32. The processor 499 may store, in the memory 488, the first value 'RTT1' of the round trip time as a difference between T0 and t31 and the second value 'RTT2' of the round trip time as a difference between T0 and t32. This example may be performed in case that AoA measurement is required.

At operation 850, from the external electronic device 401 through the UWB antenna 410, the processor 499 may receive an MRM including information indicating a time T1 when the external electronic device 401 receives the RIM, and information indicating a time T2 when the external electronic device 401 transmits the RRM. The processor 499 may receive the MRM including information indicating, instead of T1 and T2, a reply time as a difference between T1 and T2 from the external electronic device 401 through the UWB antenna 410.

At operation 860, using t31 and t32, the processor 499 may determine whether the external electronic device 401 exists within the FoV.

In an example of the operation 860, the processor 499 may obtain a first distance value by inputting T0, T1, T2, and T3 (corresponding to t31) into Equation 6 below. The processor 499 may obtain a second distance value by inputting t32 into Equation 6 instead of t31. When a distance difference between the first distance value and the second distance value is equal to or less than a specified distance reference value, the processor 499 may determine that the external electronic device 401 exists within the FoV. When the distance difference exceeds the distance reference value, the processor 499 may determine that the external electronic device 401 is outside the FoV.

$$ToF = \frac{RTT(T3 - T0) - \text{reply time}(T2 - T1)}{2} \qquad [\text{Eq. 6}]$$

$$D(\text{distance}) = ToF \times \text{speed of light}$$

In some embodiments, the processor 499 may receive information indicating T1 and T2 from the external electronic device 401 through the RRM. Alternatively or additionally, the processor 499 may receive information indicating the reply time from the external electronic device 401 through the RRM. According to such embodiments, the operation 850 may be omitted.

In some embodiments, at least one of the above operations 810, 820, 830, 840, and 850 may be performed, on behalf of the processor 499, by the UWB communication circuit 430 implemented as a chipset. For example, the UWB communication circuit 430 may obtain the first distance value by inputting T0, T1, T2, and T3 (corresponding to t31) into Equation 3 above. The UWB communication circuit 430 may obtain the second distance value by inputting t32 into Equation 3 instead of t31. The UWB communication circuit 430 may deliver the obtained distance values to the processor 499.

In some embodiments, the processor 499 may include a first processor that performs the operations 810, 820, 830, 840, and 850, and a second processor that performs the operation 860. For example, the first processor may include a communication processor embedded in a chipset together with the UWB communication circuit 430. The second processor may include an application processor.

Figure 9:
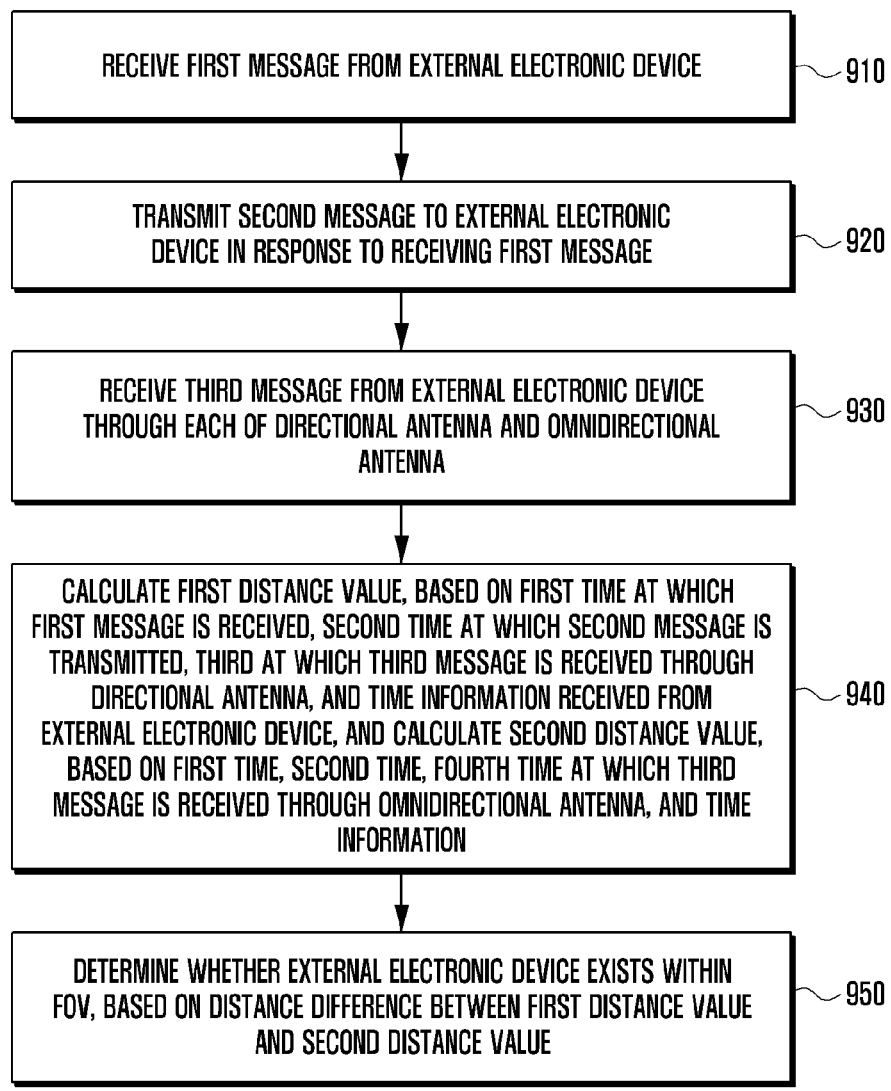
FIG. 9 illustrates first operations of a processor, according to various embodiments of the disclosure.

FIG. 9 illustrates operations of a processor 499 according to various embodiments of the disclosure.

At operation 910, the processor 499 may receive a first message (e.g., RIM) from the external electronic device 401 through the UWB antenna 410.

At operation 920, the processor 499 may transmit a second message (e.g., RRM) to the external electronic device 401 through the UWB antenna 410 in response to receiving the first message. The external electronic device 401 may transmit a third message in response to receiving the second message.

At operation 930 (e.g., the operation 650), the processor 499 may receive a third message (e.g., RFM) from the external electronic device 401 through the directional antenna 411 and the omnidirectional antenna 412.

At operation 940, the processor 499 may calculate a first distance value, based on a first time at which the first message is received, a second time at which the second message is transmitted, a third at which the third message is received by the electronic device 400 through the directional antenna 411, and time information received from the external electronic device 401. Alternatively or additionally, the processor 499 may calculate a second distance value, based on the first time, the second time, a fourth time at which the third message is received by the electronic device 400 through the omnidirectional antenna 412, and the time information. In some embodiments, the processor 499 may obtain the time information from the third message. In other embodiments, the processor 499 may obtain the time information from a fourth message (e.g., MRM) received from the external electronic device 401 after receiving the third message.

At operation 950, the processor 499 may determine whether the external electronic device 401 exists within the FoV, based on a distance difference between the first distance value and the second distance value. For example, when the distance difference is equal to or less than a specified distance reference value, the processor 499 may determine that the external electronic device 401 exists within the FoV. When the distance difference exceeds the distance reference value, the processor 499 may determine that the external electronic device 401 is outside the FoV.

In some embodiments, at least one of the operations 910, 920, 930, and 940 may be performed, instead of the processor 499, by the UWB communication circuit 430 implemented as a chipset. For example, the UWB communication circuit 430 may calculate the first distance value, based on the first time, the second time, the third time, and the time information received from the external electronic device 401, and deliver the first distance value to the processor 499. The UWB communication circuit 430 may calculate the second distance value, based on the first time, the second time, the fourth time point, and the time information, and deliver the second distance value to the processor 499.

In some embodiments, the processor 499 may include a first processor that performs the operations 910, 920, 930, and 940, and a second processor that performs the operation 950. For example, the first processor may include a communication processor embedded in a chipset together with the UWB communication circuit 430. The second processor may include an application processor.

Figure 10:
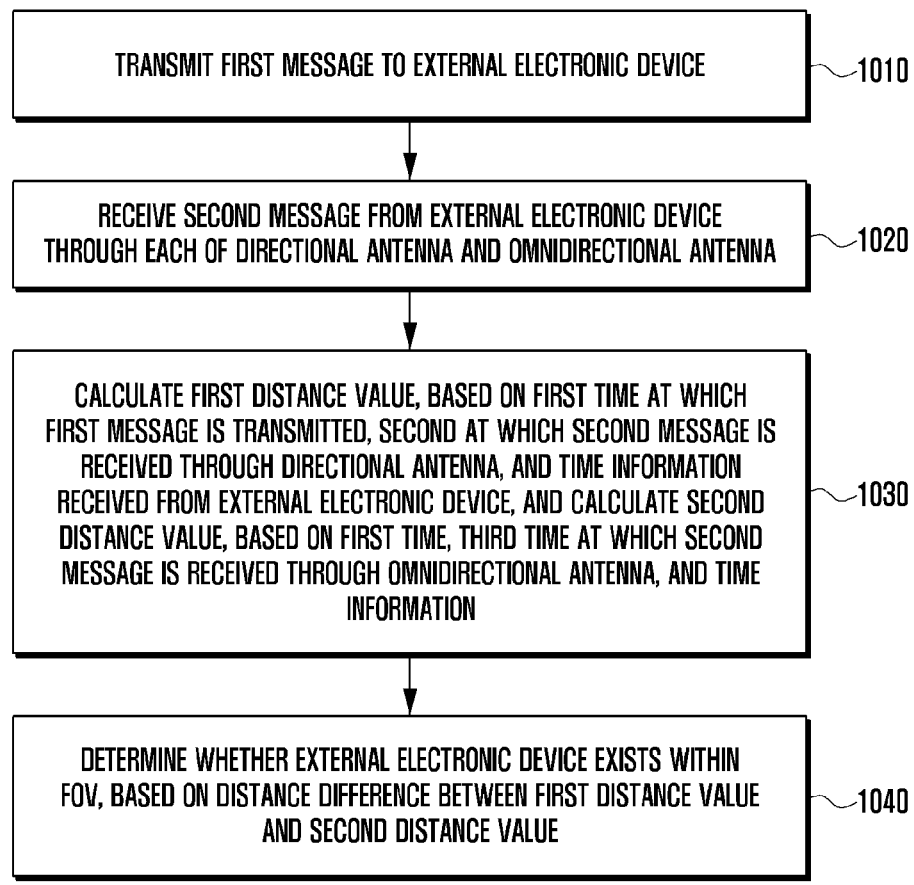
FIG. 10 illustrates second operations of a processor, according to various embodiments of the disclosure.

FIG. 10 illustrates operations of a processor 499 according to various embodiments of the disclosure.

At operation 1010, the processor 499 may transmit a first message (e.g., RIM) to the external electronic device 401 through the UWB antenna 410. The external electronic device 401 may transmit a second message (e.g., the second RRM in FIG. 7 or the RRM in FIG. 8) in response to receiving the first message.

At operation 1020 (e.g., the operation 750 or the operation 840), the processor 499 may receive the second message from the external electronic device 401 through the directional antenna 411 and the omnidirectional antenna 412.

At operation 1030, the processor 499 may calculate a first distance value, based on a first time at which the first message is transmitted, a second time at which the second message is received by the electronic device 400 through the directional antenna 411, and time information received from the external electronic device 401. Alternatively or additionally, the processor 499 may calculate a second distance value, based on the first time, a third time at which the second message is received by the electronic device 400 through the omnidirectional antenna 412, and the time information. In some embodiments, the processor 499 may obtain the time information from the second message. In other embodiments, the processor 499 may obtain the time information from a third message (e.g., MRM) received from the external electronic device 401 after receiving the second message.

At operation 1040, the processor 499 may determine whether the external electronic device 401 exists within the FoV, based on a distance difference between the first distance value and the second distance value. For example, when the distance difference is equal to or less than a specified distance reference value, the processor 499 may determine that the external electronic device 401 exists within the FoV. When the distance difference exceeds the distance reference value, the processor 499 may determine that the external electronic device 401 is outside the FoV.

In some embodiments, at least one of the operations 1010, 1020, and 1030 may be performed, instead of the processor 499, by the UWB communication circuit 430 implemented as a chipset. For example, the UWB communication circuit 430 may calculate the first distance value, based on the first time, the second time, and the time information received from the external electronic device 401, and deliver the first distance value to the processor 499. The UWB communication circuit 430 may calculate the second distance value, based on the first time, the third time, and the time information, and deliver the second distance value to the processor 499.

In some embodiments, the processor 499 may include a first processor that performs the operations 1010, 1020, and 1030, and a second processor that performs the operation 1040. For example, the first processor may include a communication processor embedded in a chipset together with the UWB communication circuit 430. The second processor may include an application processor.

Figure 11:
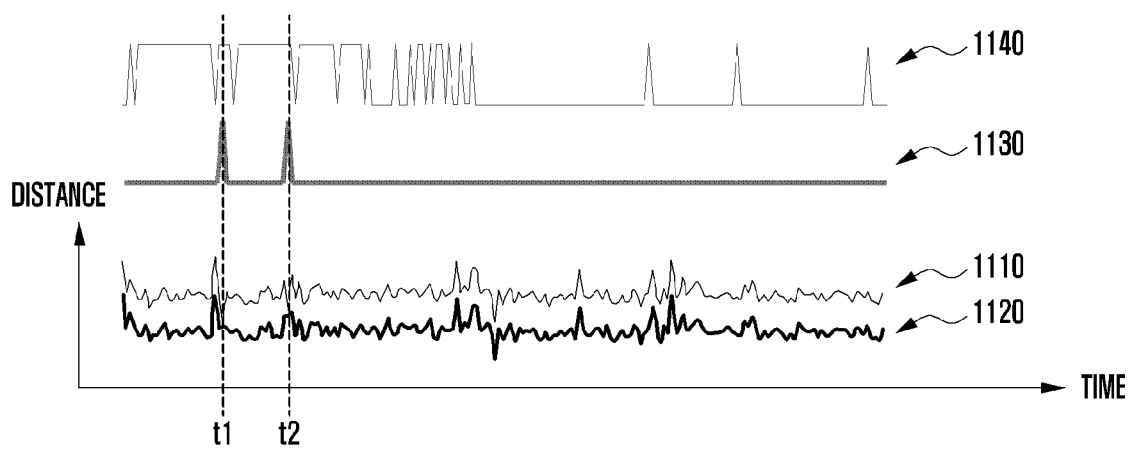
FIG. 11 is a diagram illustrating a test result in an non-line-of-sight (NLoS) situation, according to various embodiments of the disclosure.

FIG. 11 is a diagram illustrating a test result in an NLoS situation, according to various embodiments of the disclosure.

With reference to FIG. 11, a first graph 1110 represents distance values obtained using the directional antenna 411 in a state where the external electronic device is positioned outside the FoV as shown in FIG. 5, and a second graph 1120 represents distance values obtained using the omnidirectional antenna 412 in the same state.

With reference to FIG. 11, a third graph 1130 shows the result of a FoV determination operation (e.g., the operation 950 or the operation 1040) using a combination of the directional antenna 411 and the omnidirectional antenna 412 in the NLoS situation, and a fourth graph 1140 shows the result of the FoV determination operation using the directional antenna 411 in the NLoS situation. In the third graph 1130 and the fourth graph 1140, a high value indicates the FoV, and a low value indicates the non-FoV. From the fourth graph 1140, it can be seen that the FP issue, in which the result of the FoV determination operation is obtained as the FoV even though having to be the non-FoV in the NLoS situation, frequently occurs. In contrast, from the third graph 1130, it can be seen that the FP issue is relatively reduced when the FoV determination operation is performed using the combination of the directional antenna 411 and the omnidirectional antenna 412. For example, it can be seen from FIG. 11 that no FP issue occurs other than times t1 and t2. If the distance reference value to be used for comparison with the distance difference is set to a lower value, wrong determination may not occur at that times t1 and t2 as well.

According to various embodiments, an electronic device (e.g., the electronic device 400 in FIG. 4) may include a display disposed on a front surface of the electronic device, an UWB antenna including directional antennas (e.g., the antennas 371, 372, and 373 in FIG. 3B) disposed on a rear surface opposite to the front surface and forming a radiation pattern in a direction to which the rear surface faces, and at least one omnidirectional antenna (e.g., the antennas 374, 375, and 376 in FIG. 3B) forming an omnidirectional radiation pattern compared to the directional antennas, a processor (e.g., the processor 499 in FIG. 4), a communication circuit (e.g., the UWB communication circuit 430 in FIG. 4) configured to convert a message to be transmitted to an external electronic device received from the processor into an RF signal of a frequency band designated to be used for UWB communication, and output the RF signal to the UWB antenna, and configured to convert an RF signal received from the external electronic device through the UWB antenna into a message, and output the message to the processor, and a memory (e.g., the memory 488 in FIG. 4) operatively connected to the processor. The memory may store instructions that cause, when executed, the processor to calculate a first distance value, based on a first time at which a first message (e.g., RIM) is received from the external electronic device through the UWB antenna, a second time at which a second message (e.g., RRM) is transmitted to the external electronic device through the UWB antenna, a third time at which a third message (e.g., RFM) is received from the external electronic device through at least one of the directional antennas of the UWB antenna, and time information received from the external electronic device through the UWB antenna, to calculate a second distance value, based on the first time, the second time, a fourth time at which the third message is received from the external electronic device through the at least one omnidirectional antenna of the UWB antenna, and the time information, and to, based on a distance difference between the first distance value and the second distance value, determine whether the external electronic device exists within a FoV indicating a specified angular range with respect to the direction to which the rear surface faces.

The instructions may cause the processor to receive the third message through the at least one omnidirectional antenna disposed on a side surface surrounding a space between the front and rear surfaces.

The instructions may cause the processor to, when the distance difference is less than or equal to a specified distance reference value, determine that the external electronic device exists within the FoV, and when the distance difference exceeds the distance reference value, determine that the external electronic device exists outside the FoV. The instructions may cause the processor to, when the external electronic device is determined to exist within the FoV, provide information about a position of the external electronic device through the display.

The instructions may cause the processor to acquire the time information from the third message. Alternatively or additionally, the instructions may cause the processor to acquire the time information from a fourth message received from the external electronic device after the third message. The time information may include information indicating a time at which the external electronic device transmits the first message, information indicating a time at which the external electronic device receives the second message, and information indicating a time at which the external electronic device transmits the third message. Alternatively or additionally, the time information may include information indicating a round trip time that is a difference between a time at which the external electronic device transmits the first message and a time at which the external electronic device receives the second message, and information indicating a reply time that is a difference between the time at which the external electronic device receives the second message and a time at which the external electronic device transmits the third message.

According to various embodiments, an electronic device (e.g., the electronic device 400 in FIG. 4) may include a display disposed on a front surface of the electronic device, an UWB antenna including directional antennas (e.g., the antennas 371, 372, and 373 in FIG. 3B) disposed on a rear surface opposite to the front surface and forming a radiation pattern in a direction to which the rear surface faces, and at least one omnidirectional antenna (e.g., the antennas 374, 375, and 376 in FIG. 3B) forming an omnidirectional radiation pattern compared to the directional antennas, a processor (e.g., the processor 499 in FIG. 4), a communication circuit (e.g., the UWB communication circuit 430 in FIG. 4) configured to convert a message to be transmitted to an external electronic device received from the processor into a RF signal of a frequency band designated to be used for UWB communication, and output the RF signal to the UWB antenna, and configured to convert an RF signal received from the external electronic device through the UWB antenna into a message, and output the message to the processor, and a memory (e.g., the memory 488 in FIG. 4) operatively connected to the processor. The memory may store instructions that cause, when executed, the processor to calculate a first distance value, based on a first time at which a first message (e.g., RIM) is transmitted to the external electronic device through the UWB antenna, a second time at which a second message (e.g., the second RRM in FIG. 7 or the RRM in FIG. 8) is received from the external electronic device through at least one of the directional antennas of the UWB antenna, and time information received from the external electronic device through the UWB antenna, to calculate a second distance value, based on the first time, a third time at which the second message is received from the external electronic device through the at least one omnidirectional antenna of the UWB antenna, and the time information, and to, based on a distance difference between the first distance value and the second distance value, determine whether the external electronic device exists within a FoV indicating a specified angular range with respect to the direction to which the rear surface faces.

The instructions may cause the processor to receive the second message through the at least one omnidirectional antenna disposed on a side surface surrounding a space between the front and rear surfaces.

The instructions may cause the processor to, when the distance difference is less than or equal to a specified distance reference value, determine that the external electronic device exists within the FoV, and when the distance difference exceeds the distance reference value, determine that the external electronic device exists outside the FoV. The instructions may cause the processor to, when the external electronic device is determined to exist within the FoV, provide information about a position of the external electronic device through the display.

The instructions may cause the processor to acquire the time information from the second message. Alternatively or additionally, the instructions may cause the processor to acquire the time information from a third message received from the external electronic device after the second message. The time information may include information indicating a time at which the external electronic device receives the first message, and information indicating a time at which the external electronic device transmits the second message. Alternatively or additionally, the time information may include information indicating a reply time that is a difference between a time at which the external electronic device receives the first message and a time at which the external electronic device transmits the second message.

According to various embodiments, a method for operating an electronic device (e.g., the electronic device 400 in FIG. 4) having an UWB antenna including directional antennas (e.g., the antennas 371, 372, and 373 in FIG. 3B) and at least one omnidirectional antenna (e.g., the antennas 374, 375, and 376 in FIG. 3B) forming an omnidirectional radiation pattern compared to the directional antennas may include calculating (e.g., the operation 940 in FIG. 9) a first distance value, based on a first time at which a first message is received from an external electronic device through the UWB antenna, a second time at which a second message is transmitted to the external electronic device through the UWB antenna, a third time at which a third message is received from the external electronic device through at least one of the directional antennas of the UWB antenna, and time information received from the external electronic device through the UWB antenna, calculating (e.g., the operation 940 in FIG. 9) a second distance value, based on the first time, the second time, a fourth time at which the third message is received from the external electronic device through the at least one omnidirectional antenna of the UWB antenna, and the time information, and based on a distance difference between the first distance value and the second distance value, determining (e.g., the operation 950 in FIG. 9) whether the external electronic device exists within a FoV indicating a specified angular range with respect to a direction to which one surface of the electronic device, on which the directional antennas are disposed, faces.

In some embodiments, determining whether the external electronic device exists within the FoV may include, when the distance difference is less than or equal to a specified distance reference value, determining that the external electronic device exists within the FoV, and when the distance difference exceeds the distance reference value, determining that the external electronic device exists outside the FoV.

According to various embodiments, a method for operating an electronic device (e.g., the electronic device 400 in FIG. 4) having an UWB antenna including directional antennas (e.g., the antennas 371, 372, and 373 in FIG. 3B) and at least one omnidirectional antenna (e.g., the antennas 374, 375, and 376 in FIG. 3B) forming an omnidirectional radiation pattern compared to the directional antennas may include calculating (e.g., the operation 1030 in FIG. 10) a first distance value, based on a first time at which a first message is transmitted to an external electronic device through the UWB antenna, a second time at which a second message is received from the external electronic device through at least one of the directional antennas of the UWB antenna, and time information received from the external electronic device through the UWB antenna, calculating (e.g., the operation 1030 in FIG. 10) a second distance value, based on the first time, a third time at which the second message is received from the external electronic device through the at least one omnidirectional antenna of the UWB antenna, and the time information, and based on a distance difference between the first distance value and the second distance value, determining (e.g., the operation 1040 in FIG. 10) whether the external electronic device exists within a FoV indicating a specified angular range with respect to a direction to which one surface of the electronic device, on which the directional antennas are disposed, faces.

In some embodiments, determining whether the external electronic device exists within the FoV may include, when the distance difference is less than or equal to a specified distance reference value, determining that the external electronic device exists within the FoV, and when the distance difference exceeds the distance reference value, determining that the external electronic device exists outside the FoV.

Embodiments of the disclosure and the accompanying drawings are only examples presented in order to easily describe the disclosure and facilitate comprehension of the disclosure, but are not intended to limit the scope of the disclosure. Therefore, the scope of the disclosure should be construed as including all changes or modifications derived from the technical contents of the disclosure in addition to the embodiments disclosed herein.

What is claimed is:
1. An electronic device comprising:
a display disposed on a front surface of the electronic device;
an ultra-wide band (UWB) antenna including at least one directional antenna disposed on a rear surface opposite to the front surface and an omnidirectional antenna disposed on a surface different from the surface on which the at least one directional antenna is disposed;
a processor;
a communication circuit configured to convert a message to be transmitted to an external electronic device into a radio frequency (RF) signal of a frequency band designated to be used for UWB communication, and output the RF signal to the UWB antenna, and configured to convert an RF signal received from the external electronic device through the UWB antenna into a message; and
a memory operatively connected to the processor,
wherein the memory stores instructions that, when executed, cause the processor to:
receive a first message, transmitted by the external electronic device at a first time, from the UWB antenna at a second time,
transmit a second message to the external electronic device at a third time through the UWB antenna in response to receiving the first message,
receive a third message, transmitted by the external electronic device at a fifth time in response to the second message received at a fourth time, from the at least one directional antenna at a sixth time,
receive the third message, transmitted by the external electronic device, from the omnidirectional antenna at a seventh time,
calculate a first distance between the external electronic device and the electronic device, using time information and a time of receiving a message and a time of transmitting a message based on the at least one directional antenna, wherein the time information is received by the electronic device from the external electronic device through the UWB antenna and includes information about the first time, the fourth time, and the fifth time,
calculate a second distance between the external electronic device and the electronic device, using the time information and a time of receiving a message and a time of transmitting a message based on the UWB antenna including the omnidirectional antenna, and based on a distance difference between the first distance and the second distance, determine whether the external electronic device exists within a field of view (FoV).

2. The electronic device of claim 1, wherein the instructions, when executed, further cause the processor to:

calculate the first distance between the external electronic device and the electronic device, using the time information, the second time, the third time, and the sixth time, and calculate the second distance between the external electronic device and the electronic device, using the time information, the second time, the third time, and the seventh time.

3. The electronic device of claim 1, wherein the instructions, when executed, further cause the processor to:

when the distance difference is less than or equal to a specified distance reference value, determine that the external electronic device exists within the FoV, and when the distance difference exceeds the distance reference value, determine that the external electronic device exists outside the FoV.

4. The electronic device of claim 3, wherein the at least one directional antenna includes a first directional antenna and a second directional antenna, and wherein the instructions, when executed, further cause the processor to:

calculate a phase difference between RF signals arriving at the first directional antenna and the second directional antenna, based on a length between the first directional antenna and the second directional antenna, and calculate an angle of arrival (AoA) based on the phase difference, upon determining that the external electronic device exists within the FoV, determine a position of the external electronic device using the first distance and the AoA, and display information indicating the position on the display, and upon determining that the external electronic device exists outside the FoV, display, on the display, information indicating that the external electronic device exists outside the FoV.

5. The electronic device of claim 1, wherein the instructions, when executed, further cause the processor to:

acquire the time information from the third message.

6. The electronic device of claim 1, wherein the instructions, when executed, further cause the processor to:

acquire the time information from a fourth message received from the external electronic device after the third message.

7. The electronic device of claim 1, wherein the time information includes:

information indicating the first time,
information indicating the fourth time, and
information indicating the fifth time.

8. The electronic device of claim 1, wherein the time information includes:

information indicating a round trip time that is a difference between the first time and the fourth time, and
information indicating a reply time that is a difference between the fourth time and the fifth time.

9. The electronic device of claim 1, wherein the instructions, when executed, further cause the processor to:

obtain a first time value by subtracting a second value, obtained by subtracting the second time from the third time, from a first value obtained by subtracting the first time from the fourth time, obtain a second time value by subtracting a fourth value, obtained by subtracting the fourth time from the fifth time, from a third value obtained by subtracting the third time from the sixth time, obtain a third time value by subtracting the fourth value from a fifth value obtained by subtracting the third time from the seventh time, obtain the first distance by dividing a sum of the first time value and the second time value by 4 and multiplying by the speed of light, and obtain the second distance by dividing a sum of the first time value and the third time value by 4 and multiplying by the speed of light.

10. An electronic device comprising:

a display disposed on a front surface of the electronic device;

an ultra-wide band (UWB) antenna including at least one directional antenna disposed on a rear surface opposite to the front surface and an omnidirectional antenna disposed on a surface different from the surface on which the at least one directional antenna is disposed;

a processor;

a communication circuit configured to convert a message to be transmitted to an external electronic device into a radio frequency (RF) signal of a frequency band designated to be used for UWB communication, and output the RF signal to the UWB antenna, and configured to convert an RF signal received from the external electronic device through the UWB antenna into a message; and a memory operatively connected to the processor, wherein the memory stores instructions that, when executed, cause the processor to:

transmit a first message to the external electronic device at a first time through the UWB antenna, receive a second message, transmitted by the external electronic device at a third time in response to the first message received at a second time, from the at least one directional antenna at a fourth time, receive the second message transmitted by the external electronic device from the omnidirectional antenna at a fifth time, calculate a first distance between the external electronic device and the electronic device, using time information and a time of receiving a message and a time of transmitting a message based on the at least one directional antenna, wherein the time information is received by the electronic device from the external electronic device through the UWB antenna and includes information about the second time and the third time, calculate a second distance between the external electronic device and the electronic device, using the time information and a time of receiving a message and a time of transmitting a message based on the UWB antenna including the omnidirectional antenna, and based on a distance difference between the first distance and the second distance, determine whether the external electronic device exists within a field of view (FoV).

11. The electronic device of claim 10, wherein the instructions, when executed, further cause the processor to:

calculate the first distance between the external electronic device and the electronic device, using the time information, the first time and the fourth, and calculate the second distance between the external electronic device and the electronic device, using the time information, the first time and the fifth time.

12. The electronic device of claim 10, wherein the instructions, when executed, further cause the processor to:

when the distance difference is less than or equal to a specified distance reference value, determine that the external electronic device exists within the FoV, and when the distance difference exceeds the distance reference value, determine that the external electronic device exists outside the FoV.

13. The electronic device of claim 12, wherein the at least one directional antenna includes a first directional antenna and a second directional antenna, and wherein the instructions, when executed, further cause the processor to:

calculate a phase difference between RF signals arriving at the first directional antenna and the second directional antenna, based on a length between the first directional antenna and the second directional antenna, and calculate an angle of arrival (AoA) based on the phase difference, upon determining that the external electronic device exists within the FoV, determine a position of the external electronic device using the first distance and the AoA, and display information indicating the position on the display, and upon determining that the external electronic device exists outside the FoV, display, on the display, information indicating that the external electronic device exists outside the FoV.

14. The electronic device of claim 10, wherein the instructions, when executed, further cause the processor to:

acquire the time information from the second message.

15. The electronic device of claim 10, wherein the instructions, when executed, further cause the processor to:

acquire the time information from a third message received from the external electronic device after the second message.

16. The electronic device of claim 10, wherein the time information includes:

information indicating the second time, and information indicating the third time.

17. The electronic device of claim 10, wherein the time information includes:

information indicating a reply time that is a difference between the second time and the third time.

18. The electronic device of claim 10, wherein the instructions, when executed, further cause the processor to:

obtain a first time value by subtracting a second value, obtained by subtracting the second time from the third time, from a first value obtained by subtracting the first time from the fourth time, obtain a second time value by subtracting the second value from a third value obtained by subtracting the first time from the fifth time, obtain the first distance by dividing the first time value by 2 and multiplying by the speed of light, and obtain the second distance by dividing the second time value by 2 and multiplying by the speed of light.

19. A method for operating an electronic device comprising an ultra-wide band (UWB) antenna including at least one directional antenna and an omnidirectional antenna, the method comprising:

receiving a first message, transmitted by an external electronic device at a first time, from the UWB antenna at a second time;

transmitting a second message to the external electronic device at a third time through the UWB antenna in response to receiving the first message;

receiving a third message, transmitted by the external electronic device at a fifth time in response to the second message received at a fourth time, from the at least one directional antenna at a sixth time;

receiving the third message, transmitted by the external electronic device, from the omnidirectional antenna at a seventh time;

calculating a first distance between the external electronic device and the electronic device, using time information and a time of receiving a message and a time of transmitting a message based on the at least one directional antenna, wherein the time information is received by the electronic device from the external electronic device through the UWB antenna and includes information about the first time, the fourth time, and the fifth time;

calculating a second distance between the external electronic device and the electronic device, using the time information and a time of receiving a message and a time of transmitting a message based on the UWB antenna including the omnidirectional antenna; and based on a distance difference between the first distance and the second distance, determining whether the external electronic device exists within a field of view (FoV).

20. A method for operating an electronic device comprising an ultra-wide band (UWB) antenna including at least one directional antenna and an omnidirectional antenna, the method comprising:

transmitting a first message to an external electronic device at a first time through the UWB antenna;

receiving a second message, transmitted by the external electronic device at a third time in response to the first message received at a second time, from the at least one directional antenna at a fourth time;

receiving the second message transmitted by the external electronic device from the omnidirectional antenna at a fifth time;

calculating a first distance between the external electronic device and the electronic device, using time information and a time of receiving a message and a time of transmitting a message based on the at least one directional antenna, wherein the time information is received by the electronic device from the external electronic device through the UWB antenna and includes information about the second time and the third time;

calculating a second distance between the external electronic device and the electronic device, using the time information and a time of receiving a message and a time of transmitting a message based on the UWB antenna including the omnidirectional antenna; and based on a distance difference between the first distance and the second distance, determining whether the external electronic device exists within a field of view (FoV).

* * * * *